United States Patent
Date et al.

(10) Patent No.: US 7,262,256 B2
(45) Date of Patent: Aug. 28, 2007

(54) POLYCARBOXYLIC ACID MIXTURE

(75) Inventors: Hideki Date, Kurashiki (JP); Teruyoshi Shimoda, Kurashiki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 484 days.

(21) Appl. No.: 10/497,966

(22) PCT Filed: Dec. 27, 2002

(86) PCT No.: PCT/JP02/13808

§ 371 (c)(1),
(2), (4) Date: Jun. 9, 2004

(87) PCT Pub. No.: WO03/055836

PCT Pub. Date: Jul. 10, 2003

(65) Prior Publication Data

US 2005/0010021 A1    Jan. 13, 2005

(30) Foreign Application Priority Data

Dec. 27, 2001  (JP)  ............. 2001-397451

(51) Int. Cl.
C08G 59/48 (2006.01)
C07C 55/22 (2006.01)
C07C 51/08 (2006.01)
C07C 51/47 (2006.01)
C09D 163/00 (2006.01)

(52) U.S. Cl. ............... 525/533; 204/157.87

(58) Field of Classification Search ........... 204/157.87, 204/157.89; 525/533
See application file for complete search history.

(56) References Cited

U.S. PATENT DOCUMENTS

| | | | | | |
|---|---|---|---|---|---|
| 3,630,861 A | * | 12/1971 | Bizot et al. | ............ | 205/417 |
| 4,948,386 A | * | 8/1990 | Sung et al. | ............ | 44/329 |
| 2004/0059085 A1 | * | 3/2004 | Shimoda et al. | ............ | 528/408 |

FOREIGN PATENT DOCUMENTS

| | | | |
|---|---|---|---|
| DE | 19637428 A1 | * | 3/1998 |
| EP | 1041115 A2 | * | 10/2000 |
| JP | 53-135926 A | | 11/1978 |
| JP | 11-80613 A | | 3/1999 |
| WO | WO 02/66536 A1 | | 8/2002 |

OTHER PUBLICATIONS

Yasuhisa Asano et al, Fungal Degradation of Triacrylonitrile, Agric Biol Chem, 1981, 45 (1), 57-62.*
Baizer et al, J. Org. Chem, 30, 1965, 1351-1356.*
Asano et al, Agric. Biol. Chem, 45 (1), 57-62, 1981.*
English translation of DE 19637428.*
Asano Y. et al., Agric.Biol.Chem., 1981, vol. 45, No. 1, pp. 57 to 62.

* cited by examiner

*Primary Examiner*—Randy Gulakowski
*Assistant Examiner*—Alicia M. Toscano
(74) *Attorney, Agent, or Firm*—Birch, Stewart, Kolasch & Birch, LLP

(57) ABSTRACT

A polycarboxylic acid mixture comprising 80% by weight or more of 1,3,6-hexanetricarboxylic acid, wherein the polycarboxylic acid mixture has a psychometric lightness L-value of 98 or more, a psychometric chroma a-value of from −2.0 to 2.0 and a psychometric chroma b-value of from −2.0 to 3.0, and has a nitrogen content of 5,000 ppm by weight or less.

13 Claims, No Drawings

POLYCARBOXYLIC ACID MIXTURE

BACKGROUND OF THE INVENTION

1. Field of the Invention

The present invention relates to a polycarboxylic acid mixture. More particularly, the present invention is concerned with a polycarboxylic acid mixture comprising 80% by weight or more of 1,3,6-hexanetricarboxylic acid, wherein the polycarboxylic acid mixture has a psychometric lightness L-value of 98 or more, a psychometric chroma a-value of from −2.0 to 2.0 and a psychometric chroma b-value of from −2.0 to 3.0, and has a nitrogen content of 5,000 ppm by weight or less. The polycarboxylic acid mixture of the present invention has not only excellent color tone (i.e., not discolored and substantially colorless and transparent) but also excellent color tone stability under heating (hereinafter, this stability is frequently referred to simply as "heat stability"). Therefore, the polycarboxylic acid mixture of the present invention can be advantageously used for producing, for example, a paint, a detergent, a builder for a cleaning agent, an anti-limescale agent, a lubricating oil, and various polycarboxylic acid derivatives, such as esters. The present invention relates also to a method for producing the above-mentioned polycarboxylic acid mixture in high yield.

2. Prior Art 1,3,6-Hexanetricarboxylic acid is water-soluble and has good biodegradability. Therefore, recently, various application fields of 1,3,6-hexanetricarboxylic acid have been proposed.

For example, it has been reported that 1,3,6-hexanetricarboxylic acid which is derived from 1,3,6-tricyanohexane, as well as a salt of 1,3,6-hexanetricarboxylic acid, can be advantageously used as a raw material for preparing a detergent and as a lubricating agent for a chain belt for a toothed wheel (see Unexamined German Patent Application Laid-Open Specification No. 19637428).

1,3,6-Hexanetricarboxylic acid is a trifunctional acid; therefore, when it is used as a curing agent for, e.g., an epoxy compound, a cured product having a high crosslinkage density can be obtained. Especially, 1,3,6-hexanetricarboxylic acid can be advantageously used as a crosslinking agent for a paint.

Generally, 1,3,6-hexanetricarboxylic acid can be easily obtained by hydrolyzing 1,3,6-tricyanohexane. 1,3,6-Tricyanohexane can be obtained as a by-product in a process for producing adiponitrile from acrylonitrile by electrodimerization. 1,3,6-Tricyanohexane can also be produced by reacting acrylonitrile with adiponitrile in the presence of a base.

When an electrodimerization reaction of acrylonitrile is conducted, 1,3,6-tricyanohexane is obtained as a by-product and contained in a mixture of nitrites including adiponitrile as a main product. By removing the adiponitrile from the mixture by distillation or the like, the content of 1,3,6-tricyanohexane in the mixture can be increased.

However, the nitrile mixture comprised mainly of 1,3,6-tricyanohexane, which is obtained by the above-mentioned methods, is usually markedly discolored to assume a color of yellow or black.

For example, in Unexamined Japanese Patent Application Laid-Open Specification No. Sho 62-270550, 1,3,6-tricyanohexane is purified by molecular distillation, but the resultant purified product is a yellow liquid having a Hazen value of 400 or more.

A polycarboxylic acid mixture comprised mainly of 1,3,6-hexanetricarboxylic acid, which is conventionally obtained by hydrolyzing such a markedly discolored nitrile mixture as mentioned above, is also markedly discolored to assume a color of, for example, yellow brown or red brown. Further, such a discolored polycarboxylic acid mixture has a problem in that, when the mixture is heated, for example, at 80° C. or more, it exhibits an increased degree of discoloration; specifically, the color difference (ΔE) as between before and after the heating tends to be far greater than 1 and, hence, the color tone stability of the discolored polycarboxylic acid mixture under heating is poor. Therefore, a number of attempts have been made to obtain a polycarboxylic acid mixture which has an improved color tone by removing the undesired color from the discolored polycarboxylic acid mixture comprised mainly of 1,3,6-hexanetricarboxylic acid.

For example, Unexamined German Patent Application Laid-Open Specification No. 19637428 discloses the following method for producing a colorless or light yellow 1,3,6-hexanetricarboxylic acid. A nitrile mixture comprised mainly of 1,3,6-tricyanohexane, which is by-produced in an electrodimerization reaction of acrylonitrile, is hydrolyzed by heating, under reflux, the nitrile mixture together with a 20% aqueous sodium hydroxide solution to thereby obtain a hydrolysis reaction mixture, followed by cooling of the reaction mixture. A concentrated sulfuric acid is added to the obtained hydrolysis reaction mixture to thereby obtain a carboxylic acid mixture. The obtained carboxylic acid mixture is thoroughly dried to thereby obtain a beige residue. The beige residue is subjected to an extraction treatment with a dehydrated alkyl acetate by means of a Soxhlet's extractor, to obtain an extract, followed by removal of the alkyl acetate from the obtained extract under reduced pressure, thereby obtaining a colorless or light yellow 1,3,6-hexanetricarboxylic acid. Also, in this patent document, as a method other than the above-mentioned method using a Soxhlet's extractor, there is also described the following method for producing a colorless or light yellow 1,3,6-hexanetricarboxylic acid. The above-mentioned carboxylic acid mixture is extracted with tert-butyl methyl ether three times to thereby obtain an extract. Water is removed from the obtained extract by using magnesium sulfate, and the resultant is subjected to distilling off of the extraction solvent to thereby obtain a residue. The obtained residue is introduced into a mixture of acetone and cyclohexane, and the resultant mixture is cooled to thereby deposit crystals, followed by recovery of the crystals by filtration, thereby obtaining a colorless or light yellow 1,3,6-hexanetricarboxylic acid.

Further, in the above-mentioned Unexamined German Patent Application Laid-Open Specification No. 19637428, there is also described the following method for producing a colorless or light yellow 1,3,6-hexanetricarboxylic acid. 1,3,6-Tricyanohexane is mixed with crushed ice and a concentrated sulfuric acid, and the resultant mixture is subjected to hydrolysis at 140° C. to thereby obtain an aqueous mixture. The obtained aqueous mixture is extracted with tert-butyl methyl ether three times to thereby obtain an ether mixture. Water is removed from the obtained ether mixture by using magnesium sulfate, and the resultant is subjected to distilling off of the ether, thereby obtaining a colorless or light yellow 1,3,6-hexanetricarboxylic acid.

However, a 1,3,6-hexanetricarboxylic acid obtained by any of the above-mentioned methods described in Unexamined German Patent Application Laid-Open Specification No. 19637428 is disadvantageous in that it has a psychometric lightness L-value of less than 98 or a psychometric b-value of 3 or more and has poor heat stability such that the color difference (ΔE) as between before and after the 1,3,6-hexanetricarboxylic acid is allowed to stand for 18 hours at 80° C. is more than 2. (With respect to the above-mentioned color difference, explanations are given below.) Further, in any of the above-mentioned methods described in Unexamined German Patent Application Laid-Open Specification No. 19637428, it is necessary to use a large amount of an extraction solvent and, therefore, these methods are commercially disadvantageous.

Further, Agric. Biol. Chem., 45 (1) 57-62, 1981 discloses the following method for producing a colorless crystal of 1,3,6-hexanetricarboxylic acid. 1,3,6-Tricyanohexane is hydrolyzed with hydrochloric acid, and the resultant hydrolysis reaction mixture is allowed to stand at room temperature to thereby precipitate an ammonium salt (ammonium chloride), followed by filtration of the resultant to remove the ammonium salt and obtain a filtrate. The obtained filtrate is dried to obtain a crystal of 1,3,6-hexanetricarboxylic acid having a low purity. The obtained low purity crystal is dissolved in hot water, and the resultant solution is treated with activated carbon, followed by recrystallization, thereby obtaining a colorless crystal of 1,3,6-hexanetricarboxylic acid. The obtained 1,3,6-hexanetricarboxylic acid has a psychometric lightness L-value of 98 or more, a psychometric chroma a-value of 0.8 and a psychometric chroma b-value of 1.1, and is colorless. However, 1,3,6-hexanetricarboxylic acid produced by this method exhibits poor heat stability such that, when the 1,3,6-hexanetricarboxylic acid is heated, for example, at 160° C. for one hour or more, it is likely to suffer a marked discoloration. Further, the 1,3,6-hexanetricarboxylic acid produced by this method tends to disadvantageously contain a chlorine ion.

SUMMARY OF THE INVENTION

In this situation, the present inventors have made extensive and intensive studies with a view toward developing a polycarboxylic acid mixture comprised mainly of 1,3,6-hexanetricarboxylic acid, wherein the polycarboxylic acid mixture has not only a high level of color tone which is required in the field of paints, but also a high level of heat stability such that the color difference (ΔE) as between before and after the polycarboxylic acid mixture is allowed to stand at 80° C. for 18 hours is 1 or less, and the color difference (ΔE) as between before and after the polycarboxylic acid mixture is allowed to stand at 160° C. for 3 hours is 10 or less (the above-mentioned color difference is explained below). As a result, it has surprisingly been found that such excellent properties can be exhibited by a polycarboxylic acid mixture comprising 80% by weight or more of 1,3,6-hexanetricarboxylic acid, wherein the polycarboxylic acid mixture has a psychometric lightness L-value of 98 or more, a psychometric chroma a-value of from −2.0 to 2.0 and a psychometric chroma b-value of from −2.0 to 3.0, and has a nitrogen content of 5,000 ppm by weight or less. Based on this novel finding, the present invention has been completed.

Accordingly, the primary object of the present invention is to provide a polycarboxylic acid mixture which has not only excellent color tone, but also an extremely high level of heat stability.

Another object of the present invention is to provide a method for producing the above-mentioned excellent polycarboxylic acid mixture easily and efficiently from a hydrolysis reaction mixture obtained by hydrolyzing a nitrile mixture comprised mainly of 1,3,6-tricyanohexane.

The foregoing and other objects, features and advantages of the present invention will be apparent from the following detailed description and appended claims.

DETAILED DESCRIPTION OF THE INVENTION

In one aspect of the present invention, there is provided a polycarboxylic acid mixture comprising 80% by weight or more of 1,3,6-hexanetricarboxylic acid, the polycarboxylic acid mixture having a psychometric lightness L-value of 98 or more, a psychometric chroma a-value of from −2.0 to 2.0 and a psychometric chroma b-value of from −2.0 to 3.0, the polycarboxylic acid mixture having a nitrogen content of 5,000 ppm by weight or less.

In another aspect of the present invention, there is provided a method for producing the above-mentioned polycarboxylic acid mixture, which comprises the steps of:

(1) adjusting the pH value of an aqueous hydrolysis reaction mixture solution obtained by hydrolyzing, in an aqueous medium, a nitrile mixture comprised mainly of 1,3,6-tricyanohexane to a level in the range of from 3 to 13, thereby obtaining an aqueous solution containing a salt of a polycarboxylic acid mixture, the nitrile mixture being obtained as a by-product in a process for producing adiponitrile from acrylonitrile by electrodimerization or obtained by reacting acrylonitrile with adiponitrile, (2) treating the aqueous solution with a solid adsorbent to obtain a treated aqueous solution, (3) converting the salt of a polycarboxylic acid mixture in the treated aqueous solution obtained in step (2) to a polycarboxylic acid mixture using an ion exchange resin, an electrodialyzer or an acid, thereby obtaining an aqueous solution containing a polycarboxylic acid mixture, and (4) recovering the polycarboxylic acid mixture from the aqueous solution obtained in step (3), wherein when the acid is used in step (3) for converting the salt to the polycarboxylic acid mixture, the recovered polycarboxylic acid mixture is subjected to an extraction with an organic solvent for the polycarboxylic acid mixture to obtain the polycarboxylic acid mixture as an extract with the organic solvent, followed by separation of the polycarboxylic acid mixture in the extract from the organic solvent.

For easy understanding of the present invention, the essential features and various preferred embodiments of the present invention are enumerated below.

1. A polycarboxylic acid mixture comprising 80% by weight or more of 1,3,6-hexanetricarboxylic acid,
   the polycarboxylic acid mixture having a psychometric lightness L-value of 98 or more, a psychometric chroma a-value of from −2.0 to 2.0 and a psychometric chroma b-value of from −2.0 to 3.0,
   the polycarboxylic acid mixture having a nitrogen content of 5,000 ppm by weight or less.

2. The polycarboxylic acid mixture according to item 1 above, which has a psychometric lightness L-value of 99 or more, a psychometric chroma a-value of from −1.0 to 1.0 and a psychometric chroma b-value of from −1.0 to 1.0.

3. The polycarboxylic acid mixture according to item 1 or 2 above, which has a nitrogen content of 500 ppm by weight or less.

4. The polycarboxylic acid mixture according to any one of items 1 to 3 above, which is obtained from a hydrolysis reaction mixture obtained by hydrolyzing a nitrile mixture comprised mainly of 1,3,6-tricyanohexane,
the nitrile mixture being obtained as a by-product in a process for producing adiponitrile from acrylonitrile by electrodimerization or obtained by reacting acrylonitrile with adiponitrile.

5. A method for producing the polycarboxylic acid mixture of item 1 above, which comprises the steps of:
  (1) adjusting the pH value of an aqueous hydrolysis reaction mixture solution obtained by hydrolyzing, in an aqueous medium, a nitrile mixture comprised mainly of 1,3,6-tricyanohexane to a level in the range of from 3 to 13, thereby obtaining an aqueous solution containing a salt of a polycarboxylic acid mixture,
  the nitrile mixture being obtained as a by-product in a process for producing adiponitrile from acrylonitrile by electrodimerization or obtained by reacting acrylonitrile with adiponitrile,
  (2) treating the aqueous solution with a solid adsorbent to obtain a treated aqueous solution,
  (3) converting the salt of a polycarboxylic acid mixture in the treated aqueous solution obtained in step (2) to a polycarboxylic acid mixture using an ion exchange resin, an electrodialyzer or an acid, thereby obtaining an aqueous solution containing a polycarboxylic acid mixture, and
  (4) recovering the polycarboxylic acid mixture from the aqueous solution obtained in step (3),
  wherein when the acid is used in step (3) for converting the salt to the polycarboxylic acid mixture, the recovered polycarboxylic acid mixture is subjected to an extraction with an organic solvent for the polycarboxylic acid mixture to obtain the polycarboxylic acid mixture as an extract with the organic solvent, followed by separation of the polycarboxylic acid mixture in the extract from the organic solvent.

6. The method according to item 5 above, wherein the aqueous medium used for the hydrolyzing of the nitrile mixture in step (1) is water.

7. The method according to item 5 above, wherein, in step (1), the pH value of the aqueous solution is adjusted to a level in the range of from 5 to 9.

8. The method according to item 5 above, wherein the solid adsorbent used in step (2) is at least one adsorbent selected from the group consisting of an activated carbon, a silica gel and an activated alumina.

9. The method according to item 5 above, wherein the conversion of the salt to the polycarboxylic acid mixture in step (3) is performed using the electrodialyzer.

10. The method according to any one of items 5 to 9 above, wherein the aqueous solution obtained in step (3) is subjected to crystallization before step (4).

11. A curable composition comprising:
  (a) a compound having two or more epoxy groups in a molecule thereof, and
  (b) a curing agent comprising the polycarboxylic acid mixture of item 1 above.

12. A paint comprising the curable composition of item 11 above.

13. A cured composition obtained by curing the curable composition of item 11 above.

Hereinbelow, the present invention is described in detail.

The polycarboxylic acid mixture of the present invention comprises 80% by weight or more of 1,3,6-hexanetricarboxylic acid (i.e., 4-carboxy-1,8-octanedioic acid). With respect to the content of a polycarboxylic acid other than 1,3,6-hexanetricarboxylic acid in the polycarboxylic acid mixture, there is no particular limitation. In the present invention, the term "polycarboxylic acid" means an aliphatic carboxylic acid having 2 to 4 carboxyl groups in a molecule thereof and having a molecular weight of 400 or less. Specific examples of polycarboxylic acids other than 1,3,6-hexanetricarboxylic acid include adipic acid and 3-carboxymethyl-1,5-pentanedicarboxylic acid.

With respect to the composition of the polycarboxylic acid mixture of the present invention, there is no particular limitation so long as the content of 1,3,6-hexanetricarboxylic acid in the polycarboxylic acid mixture is 80% by weight or more. However, taking into consideration the case where in the production of a paint by using the polycarboxylic acid mixture of the present invention, the polycarboxylic acid mixture is dissolved in a solvent at about 80 to 130° C. or is melt-kneaded with a resin having a reactive functional group at about 100 to 130° C., or the case where the polycarboxylic acid mixture is dissolved in water, it is preferred that the content of 1,3,6-hexanetricarboxylic acid in the polycarboxylic acid mixture is 85% by weight or more, the content of adipic acid in the polycarboxylic acid mixture is 5% by weight or less and the content of 3-carboxymethyl-1,5-pentanedicarboxylic acid in the polycarboxylic acid mixture is 10% by weight or less. It is more preferred that the content of 1,3,6-hexanetricarboxylic acid is 95% by weight or more, the content of adipic acid is 1% by weight or less and the content of 3-carboxymethyl-1,5-pentanedicarboxylic acid is 4% by weight or less. It is most preferred that the content of 1,3,6-hexanetricarboxylic acid is 98% by weight or more.

When the content of 1,3,6-hexanetricarboxylic acid in the polycarboxylic acid mixture is less than 80% by weight, it is likely that, in various cases, the polycarboxylic acid mixture cannot exhibit characteristics that are inherently possessed by 1,3,6-hexanetricarboxylic acid. For example, when the polycarboxylic acid mixture has a content of 1,3,6-hexanetricarboxylic acid of less than 80% by weight and has a content of a polycarboxylic acid (having a relatively low solubility in water), such as adipic acid, of 10% by weight or more, it is likely that the polycarboxylic acid mixture is not uniformly dissolved in an aqueous medium, such as water.

The content of a polycarboxylic acid (such as 1,3,6-hexanetricarboxylic acid) in the polycarboxylic acid mixture is obtained from the area of the peak ascribed to the polycarboxylic acid, wherein the peak is measured by liquid chromatography using a refractive index (RI) detector.

The polycarboxylic acid mixture of the present invention has a characteristic feature with respect to color tone. Specifically, the polycarboxylic acid mixture of the present invention has a psychometric lightness L-value of 98 or more, a psychometric chroma a-value of from −2.0 to 2.0 and a psychometric chroma b-value of from −2.0 to 3.0.

The psychometric lightness L-value, psychometric chroma a-value and psychometric chroma b-value of the polycarboxylic acid mixture are measured in accordance with JIS Z 8722, wherein the measurement is conducted at 25° C. with respect to a solution obtained by dissolving 0.400 g of the polycarboxylic acid mixture in 4.0 ml of distilled water. Specifically, these values are obtained as follows. The spectral transmission of the above solution is measured by spectrometry using the standard lights of type C having wave lengths of from 380 to 780 nm to obtain X, Y and Z tristimulus values in the XYZ-space. Using the obtained X, Y and Z values, the L-, a- and b-values are calculated by the following Hunter's color difference equation prescribed in JIS Z 8730:

$$L=10Y^{0.5},$$

$$a=17.5\ (1.02X-Y)/Y^{0.5} \text{ and}$$

$$b=7.0\ (Y-0.847Z)/Y^{0.5}$$

wherein L, a and b represent the psychometric lightness L-value, psychometric chroma a-value and psychometric chroma b-value in the Hunter's color difference equation, respectively, and X, Y and Z represent the X, Y and Z tristimulus values in the XYZ-space, respectively.

Generally, the psychometric lightness L-value is a yardstick for whiteness and the upper limit value thereof is 100. The higher the psychometric lightness L-value of a sample, the higher the whiteness of the sample. On the other hand, the lower the psychometric lightness L-value of the sample, the higher the blackness of the sample. The psychometric chroma a-value is a yardstick for greenness and redness. When the psychometric chroma a-value of the sample is 0, the greenness and redness of the sample are each 0. In the case where the sample has a psychometric chroma a-value of less than 0, the lower the psychometric chroma a-value of the sample, the higher the greenness of the sample; on the other hand, in the case where the sample has a psychometric chroma a-value of higher than 0, the higher the psychometric chroma a-value of the sample, the higher the redness of the sample. The psychometric chroma b-value is a yardstick for blueness and yellowness. When the psychometric chroma b-value of the sample is 0, the blueness and yellowness of the sample are each 0. In the case where the sample has a psychometric chroma b-value of less than 0, the lower the psychometric chroma b-value of the sample, the higher the blueness of the sample; on the other hand, in the case where the sample has a psychometric chroma b-value of higher than 0, the higher the psychometric chroma b-value of the sample, the higher the yellowness of the sample.

When the sample has a psychometric lightness L-value of 100, a psychometric chroma a-value of 0 and a psychometric chroma b-value of 0, this means that the sample is colorless. Very close to these values are, respectively, the psychometric lightness L-value, psychometric chroma a-value and psychometric chroma b-value of the polycarboxylic acid mixture of the present invention. This means that the polycarboxylic acid mixture of the present invention has a very excellent color tone (i.e., not discolored, substantially colorless and transparent).

As mentioned above, the polycarboxylic acid mixture of the present invention has a psychometric lightness L-value of 98 or more, a psychometric chroma a-value of from −2.0 to 2.0 and a psychometric chroma b-value of from −2.0 to 3.0. The closer to 100 the psychometric lightness L-value of the polycarboxylic acid mixture, the more preferred the polycarboxylic acid mixture. The psychometric lightness L-value of the polycarboxylic acid mixture is preferably 99 or more, more preferably 99.5 or more. The closer to 0 the psychometric chroma a-value of the polycarboxylic acid mixture, the more preferred the polycarboxylic acid mixture. The psychometric chroma a-value of the polycarboxylic acid mixture is preferably from −1.0 to 1.0, more preferably from −0.5 to 0.5, most preferably from −0.2 to 0.2. The closer to 0 the psychometric chroma b-value of the polycarboxylic acid mixture, the more preferred the polycarboxylic acid mixture. The psychometric chroma b-value of the polycarboxylic acid mixture is preferably from −1.0 to 1.0, more preferably from −0.5 to 0.5. When even one of the psychometric lightness L-value, psychometric chroma a-value and psychometric chroma b-value of the polycarboxylic acid mixture falls outside the above-mentioned range, a disadvantage is likely to be caused wherein, when the polycarboxylic acid mixture is used, for example, for producing a paint, the produced paint is discolored to assume a color of yellow or gray. Further, when even one of the psychometric lightness L-value, psychometric chroma a-value and psychometric chroma b-value of the polycarboxylic acid mixture falls outside the above-mentioned range, the heat stability (i.e., color tone stability under heating) of the polycarboxylic acid mixture becomes poor and the below-described color difference (ΔE) of the polycarboxylic acid mixture is far more than 2. Accordingly, when such a polycarboxylic acid mixture is used for producing a paint which is curable by heating, it is likely that the produced paint becomes discolored to assume a color of yellow or the like when the paint is cured by heating.

The polycarboxylic acid mixture of the present invention has a nitrogen content of 5,000 ppm by weight or less. The nitrogen content of the polycarboxylic acid mixture is preferably 1,000 ppm by weight or less, more preferably 500 ppm by weight or less. When the nitrogen content of the polycarboxylic acid mixture is more than 5,000 ppm, the heat stability of the polycarboxylic acid mixture becomes poor. Specifically, when such a polycarboxylic acid mixture is heated at 80° C. or more, it is likely that the polycarboxylic acid mixture becomes discolored or that the polycarboxylic acids of the mixture are caused to be modified to form nitrogen-containing compounds, such as an amide, an imide and a polymer having an amide bond or an imide bond.

In the present invention, the nitrogen content of the polycarboxylic acid mixture is calculated from the nitrogen concentration of a gas which is generated when the polycarboxylic acid mixture is burned at 800° C.

Nitrogen contained in the polycarboxylic acid mixture of the present invention can be present in the form of various nitrogen-containing compounds, groups or ions. For example, the nitrogen can be present in the form of a carboxylate (such as an ammonium salt of a carboxylic acid), an ammonium ion as a component of an inorganic salt, or a group (such as an amide group or an imide group). Examples of inorganic salts include ammonium chloride and ammonium sulfate.

By virtue of the fact that the polycarboxylic acid mixture of the present invention has a nitrogen content of 5,000 ppm or less, the polycarboxylic acid mixture exhibits excellent heat stability (color tone stability under heating). Specifically, the color difference (ΔE) of the polycarboxylic acid mixture represented by the following equation is generally 2 or less, preferably 1 or less:

$$\Delta E=[(\Delta L)^2+(\Delta a)^2+(\Delta b)^2]^{1/2}$$

wherein ΔL represents the difference in the psychometric lightness L-value of the polycarboxylic acid mixture as between before and after the polycarboxylic acid mixture is heated at 80° C. for 18 hours, Δa represents the difference in the psychometric chroma a-value of the polycarboxylic acid mixture as between before and after the polycarboxylic acid mixture is heated at 80° C. for 18 hours, and Δb represents the difference in the psychometric chroma b-value of the polycarboxylic acid mixture as between before and after the polycarboxylic acid mixture is heated at 80° C. for 18 hours.

The above-mentioned color difference (ΔE) of the polycarboxylic acid mixture is a yardstick for the heat stability (i.e., color tone stability under heating) of the polycarboxylic acid mixture. The closer to 0 the color difference of the polycarboxylic acid mixture, the higher the heat stability of the polycarboxylic acid mixture.

Further, it is preferred that the polycarboxylic acid mixture has another type of color difference of 10 or less, wherein this type of color difference is measured in substantially the same manner as in the above-mentioned color difference ($\Delta E$), except that the heat treatment of the polycarboxylic acid mixture is conducted at 160° C. for 3 hours.

In this connection, the following should be noted. In the method described in the above-mentioned Agric. Biol. Chem., 45 (1) 57-62, 1981, ammonium chloride, which has high solubility in water, is by-produced during the hydrolysis of 1,3,6-tricyanohexane. This by-produced ammonium chloride cannot be satisfactorily removed, so that even a crystal of 1,3,6-hexanetricarboxylic acid obtained by recrystallization as described in the Agric. Biol. Chem. above has a nitrogen content as large as 8,000 ppm or more. Therefore, the crystal of 1,3,6-hexanetricarboxylic acid becomes markedly discolored when the crystal is heated, for example, at 160° C. for 3 hours or more.

With respect to the raw materials for producing the polycarboxylic acid mixture of the present invention, there is no particular limitation. For example, the polycarboxylic acid mixture can be obtained from a hydrolysis reaction mixture which is obtained by hydrolyzing a nitrile mixture comprised mainly of 1,3,6-tricyanohexane, wherein the nitrile mixture is obtained as a by-product in a process for producing adiponitrile from acrylonitrile by electrodimerization or obtained by reacting acrylonitrile with adiponitrile. The above-mentioned nitrile mixture is generally markedly discolored.

Hereinbelow, explanations are given with respect to a method for producing the polycarboxylic acid mixture of the present invention in high yield. The polycarboxylic acid mixture of the present invention can be produced in high yield by a method which comprises the steps of:

(1) adjusting the pH value of an aqueous hydrolysis reaction mixture solution obtained by hydrolyzing, in an aqueous medium, a nitrile mixture comprised mainly of 1,3,6-tricyanohexane to a level in the range of from 3 to 13, thereby obtaining an aqueous solution containing a salt of a polycarboxylic acid mixture, the nitrile mixture being obtained as a by-product in a process for producing adiponitrile from acrylonitrile by electrodimerization or obtained by reacting acrylonitrile with adiponitrile, (2) treating the aqueous solution with a solid adsorbent to obtain a treated aqueous solution, (3) converting the salt of a polycarboxylic acid mixture in the treated aqueous solution obtained in step (2) to a polycarboxylic acid mixture using an ion exchange resin, an electrodialyzer or an acid, thereby obtaining an aqueous solution containing a polycarboxylic acid mixture, and (4) recovering the polycarboxylic acid mixture from the aqueous solution obtained in step (3), wherein when the acid is used in step (3) for converting the salt to the polycarboxylic acid mixture, the recovered polycarboxylic acid mixture is subjected to an extraction with an organic solvent for the polycarboxylic acid mixture to obtain the polycarboxylic acid mixture as an extract with the organic solvent, followed by separation of the polycarboxylic acid mixture in the extract from the organic solvent.

Explanations are given with respect to the above-mentioned step (1). In step (1), the pH value of an aqueous hydrolysis reaction mixture solution obtained by hydrolyzing, in an aqueous medium, a nitrile mixture comprised mainly of 1,3,6-tricyanohexane is adjusted to a level in the range of from 3 to 13, thereby obtaining an aqueous solution containing a salt of a polycarboxylic acid mixture.

The above-mentioned nitrile mixture is obtained as a by-product in a process for producing adiponitrile from acrylonitrile by electrodimerization or obtained by reacting acrylonitrile with adiponitrile. Therefore, the nitrile mixture is generally markedly discolored.

Explanations are given with respect to a method for obtaining the above-mentioned nitrile mixture as a by-product in a process for producing adiponitrile from acrylonitrile by electrodimerization.

When acrylonitrile is subjected to electrodimerization, a discolored reaction mixture which is comprised mainly of adiponitrile and contains various nitrile compounds (i.e., cyano group-containing compounds) is obtained. The discolored reaction mixture also contains acrylonitrile which remains unreacted in the electrodimerization. Examples of compounds obtained as by-products in the electrodimerization of acrylonitrile include propionitrile, α-methylglutaronitrile, hydroxypropionitrile, succinonitrile, a nitrile compound containing 3 cyano groups (hereinafter, such a nitrile compound is frequently referred to as "trinitrile compound") and a nitrile compound containing 4 or more cyano groups (hereinafter, such a nitrile compound is frequently referred to as "polynitrile compound"). Specific examples of trinitrile compounds include 1,3,6-tricyanohexane and 3-cyanomethyl-1,5-dicyanopentane.

It is described in J. Org. Chem., 30 (5) 1351 (1965) that, in the electrodimerization of acrylonitrile, a trinitrile compound and/or a polynitrile compound produced in an amount which is not negligible.

Generally, as a main example of a trinitrile compound by-produced in the electrodimerization of acrylonitrile, there can be mentioned 1,3,6-tricyanohexane. In the electrodimerization of acrylonitrile, 3-cyanomethyl-1,5-dicyanopentane, which is an isomer of 1,3,6-tricyanohexane, is also by-produced in a small amount.

A compound (such as acrylonitrile or adiponitrile) having a boiling point lower than that of a trinitrile compound, and optionally a polynitrile compound are removed from the above-mentioned discolored reaction mixture by extraction using a solvent or by distillation under reduced pressure, thereby obtaining the above-mentioned nitrile mixture comprised mainly of 1,3,6-tricyanohexane. The nitrile mixture may contain not only a compound having a high boiling point but also a compound having a low boiling point which has not been removed by the above-mentioned removal operation (extraction or distillation).

The total content of 1,3,6-tricyanohexane and 3-cyanomethyl-1,5-dicyanopentane in the above-mentioned nitrile mixture is preferably 85% by weight or more, more preferably 90% by weight or more. When the total content of 1,3,6-tricyanohexane and 3-cyanomethyl-1,5-dicyanopentane is less than 85% by weight, the nitrile mixture inevitably contains the above-mentioned compound having a low boiling point, a polynitrile compound and a discolored compound which is difficult to identify and determine, wherein the total content of these compounds in the nitrile mixture is 15% by weight or more, thereby causing disadvantages wherein the purity of the finally obtained polycarboxylic acid mixture (i.e., the total content of the polycarboxylic acids in the finally obtained polycarboxylic acid mixture) is lowered and the polycarboxylic acid mixture suffers discoloration. Further, for improving the purity of the polycarboxylic acid mixture, various processes for purifying the polycarboxylic acid mixture are required after the polycarboxylic acid mixture is obtained. As a result, it is likely that the yield of the polycarboxylic acid mixture finally obtained and the production efficiency are lowered.

In the present invention, with respect to the content of 1,3,6-tricyanohexane in the above-mentioned nitrile mixture, there is no particular limitation so long as the content of 1,3,6-hexanetricarboxylic acid or a salt thereof in a polycarboxylic acid mixture or a salt thereof, which is obtained by hydrolyzing the above-mentioned nitrile mixture, is 80% by weight or more. The content of 1,3,6-tricyanohexane in the above-mentioned nitrile mixture is generally 80% by weight or more.

The nitrile mixture generally contains 3-cyanomethyl-1,5-dicyanopentane in an amount of from 0.01 to 10% by weight, based on the weight of the nitrile mixture. In the present invention, when it is intended, for example, to obtain, by crystallization, a high purity 1,3,6-hexanetricarboxylic acid in high yield, the content of 3-cyanomethyl-1,5-dicyanopentane in the nitrile mixture is preferably 5% by weight or less, more preferably 2% by weight or less.

With respect to the electrodimerization of acrylonitrile, explanations are given below in more detail.

With respect to the electrolytic cell used for the electrodimerization of acrylonitrile, there is no particular limitation. For example, there can be used a so-called diaphragm electrolytic cell which comprises a cathode compartment containing a cathode, an anode compartment containing an anode, wherein the cathode compartment and the anode compartment are partitioned by a cation exchange membrane. Alternatively, there can also be used a single electrolytic cell having no ion exchange membrane as a diaphragm. With respect to electrolyses using such electrolytic cells, reference can be made to Examined Japanese Patent Application Publication No. Sho 45-24128 and Unexamined Japanese Patent Application Laid-Open Specification Nos. Sho 59-59888 and Sho 59-185788.

When the electrodimerization of acrylonitrile is performed using the above-mentioned diaphragm electrolytic cell, it is generally possible to use a cathode having a high hydrogen overvoltage. Preferred examples of such cathodes include lead, cadmium and a metal alloy comprised mainly of these metals. As an anode, it is preferred to use a metal having high corrosion resistance, such as lead, a lead alloy or platinum. Lead and a lead alloy are more preferred. As a diaphragm, a cation exchange membrane can be used. As an anolyte, an aqueous sulfuric acid solution can be used. During the electrodimerization, the catholyte comprises acrylonitrile, adiponitrile, a trinitrile compound, a compound (other than mentioned above) by-produced by the electrodimerization, water and a conductivity supporting salt. The catholyte is present in the form of either an emulsion comprising an oil phase and an aqueous phase or a uniform solution, wherein the latter is realized when acrylonitrile is present in an excess amount.

As a preferred example of a conductivity supporting salt, there can be mentioned a quaternary ammonium salt represented by the following formula:

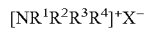

wherein each of $R^1$, $R^2$ and $R^3$ independently represents a $C_1$-$C_5$ alkyl group, $R^4$ represents a $C_1$-$C_{16}$ alkyl group and $X^-$ represents an anion of sulfuric acid, carbonic acid, an alkyl sulfuric acid, phosphoric acid or the like, or a residual group of an organic acid or a multivalent organic acid.

The pH value of the catholyte is generally in the range of from 5 to 12.

During the electrodimerization, the temperature of the electrolytic liquid in the electrolytic cell is generally in the range from 40 to 60° C. and the current density is generally in the range of from 5 to 50 A per 1 $dm^2$ of the surface area of the cathode. The cathode and anode are disposed at a distance of 1 to 20 mm through a diaphragm, and each of the catholyte and the anolyte is generally flowed through the diaphragm at a linear velocity of 0.1 to 10.0 m/sec.

When the electrodimerization of acrylonitrile is performed using a single electrolytic cell which has no ion exchange membrane as a diaphragm, it is preferred to use, as a cathode, lead, cadmium, mercury or a metal alloy comprising at least one metal selected from the group consisting of the above-mentioned metals; and it is preferred to use, as an anode, iron, nickel or an alloy of such metal. The electrolytic liquid is comprised mainly of an alkali metal salt, the above-mentioned quaternary ammonium salt and water. During the electrodimerization, the electrolytic liquid comprises the above-mentioned compounds (i.e., an alkali metal salt, the above-mentioned quaternary ammonium salt and water), acrylonitrile, adiponitrile, a trinitrile compound and a compound (other than mentioned above) by-produced by the electrodimerization, and is present in the form of an emulsion or a uniform solution. Examples of cations of alkali metal salts include cations of lithium, sodium, potassium and rubidium. Examples of anions of alkali metal salts include anions of alkali metal salts of inorganic acids (such as phosphoric acid, boric acid, carbonic acid and sulfuric acid) and residual groups of multivalent acids.

With respect to the method for obtaining the above-mentioned nitrile mixture (comprised mainly of 1,3,6-tricyanohexane) from the electrolytic liquid after completion of the electrodimerization of acrylonitrile, there is no particular limitation. Examples of such methods for obtaining the nitrile mixture include a conventional extraction method and a conventional distillation. These methods can be used individually or in combination.

For example, when the electrolytic liquid after completion of the electrodimerization of acrylonitrile takes a form of an emulsion comprising an oil phase and an aqueous phase, the nitrile mixture is obtained as follows. Low boiling point compounds, such as acrylonitrile remaining unreacted, propionitrile (which is by-produced by the electrodimerization), are removed from the emulsion by distillation. The resultant emulsion is subjected to emulsion destruction to separate the emulsion into an oil phase and an aqueous phase, wherein the aqueous phase contains inorganic compounds and a quaternary ammonium salt and the oil phase contains water in a small amount, low boiling point compounds, and high boiling point compounds (such as adiponitrile and a trinitrile compound).

On the other hand, when the electrolytic liquid after completion of the electrodimerization of acrylonitrile takes a form of a uniform solution, the nitrile mixture is obtained, for example, as follows. Water and a nonaqueous organic solvent, such as methylene chloride, are added to the electrolytic liquid to thereby extract inorganic salts and a quaternary ammonium salt into the aqueous phase and extract high boiling point compounds (such as adiponitrile and a trinitrile compound) into the oil phase.

In either of the above-mentioned two cases, a compound (such as adiponitrile) having a boiling point lower than that of a trinitrile compound is removed by a conventional distillation or the like, thereby obtaining, as a residue, a high boiling point mixture containing the above-mentioned nitrile mixture comprised mainly of 1,3,6-tricyanohexane. As mentioned above, the high boiling point mixture (as a distillation residue) containing the nitrile mixture contains not only low boiling point compounds (such as adiponitrile) which has not been removed by the operation for removing low boiling point compounds, but also high boiling point compounds, such as a polynitrile compound.

In the high boiling point mixture as a distillation residue, when the total content of 1,3,6-tricyanohexane and 3-cyanomethyl-1,5-dicyanopentane is 85% by weight or less, it is also possible to perform a distillation at least one more time for removing, from the residue, low boiling point compounds (such as adiponitrile) and optionally high boiling point compounds, thereby obtaining a nitrile mixture having a total content of 1,3,6-tricyanohexane and 3-cyanomethyl-1,5-dicyanopentane of 85% by weight or more. As preferred examples of such a distillation, there can be mentioned a molecular distillation and a thin film distillation which are described in Unexamined Japanese Patent Application Laid-Open Specification No. Sho 62-270550. Further, in the present invention, for increasing the above-mentioned total content of 1,3,6-tricyanohexane and 3-cyanomethyl-1,5-dicyanopentane in the above-mentioned residue to 85% by weight or more, the following operation can be performed. The high boiling point mixture residue is subjected to an extraction with a solvent which can dissolve only 1,3,6-tricyanohexane and 3-cyanomethyl-1,5-dicyanopentane, followed by removal of the solvent from the resultant extract. By this operation, a nitrile mixture having a total content of 1,3,6-tricyanohexane and 3-cyanomethyl-1,5-dicyanopentane of 85% by weight or more can be obtained.

With respect to the method for obtaining the nitrile mixture by reacting acrylonitrile with adiponitrile, explanations are made below.

With respect to the method for obtaining the nitrile mixture by reacting acrylonitrile with adiponitrile, there is no particular limitation, and any conventional method can be employed. For example, a nitrile mixture comprised mainly of 1,3,6-tricyanohexane can be obtained by a method described in Examined Japanese Patent Application Publication No. Sho 61-3780, in which acrylonitrile is reacted with adiponitrile in the presence of a basic catalyst, such as a metal alcoholate of isopropyl alcohol or t-butyl alcohol.

With respect to each of the nitrile mixtures obtained by the above-mentioned methods, it is preferred that the content of adiponitrile in the nitrile mixture is 10% by weight or less and that the nitrile mixture is so pure that the total content of 1,3,6-tricyanohexane and 3-cyanomethyl-1,5-dicyanopentane in the nitrile mixture is 85% by weight or more.

The aqueous solution obtained in step (1) is an aqueous solution of a hydrolysis reaction mixture obtained by hydrolyzing, in an aqueous medium, the nitrile mixture obtained by any of the above-mentioned methods. With respect to the hydrolysis of the nitrile mixture, explanations are made below.

The hydrolysis of the nitrile mixture is performed using an alkali or an acid in an aqueous medium. The term "aqueous medium" means any of water and an organic solvent which contains water in an amount sufficient for the hydrolysis of the nitrile mixture and does not adversely affect the hydrolysis reaction. As an aqueous medium, water is preferred.

With respect to the alkali used for the hydrolysis of the nitrile mixture, there is no particular limitation so long as it is a compound which exhibits alkaline property in an aqueous solution thereof. Examples of alkalis include alkali metal compounds, alkaline earth metal compounds and nitrogen compounds.

Examples of alkali metal compounds include alkali metal hydroxides, such as lithium hydroxide, sodium hydroxide, potassium hydroxide, rubidium hydroxide and cesium hydroxide; alkali metal carbonates, such as lithium carbonate, sodium carbonate, potassium carbonate, rubidium carbonate and cesium carbonate; alkali metal hydrogencarbonates, such as lithium hydrogencarbonate, sodium hydrogencarbonate, potassium hydrogencarbonate, rubidium hydrogencarbonate and cesium hydrogencarbonate; and alkali metal alkoxides, such as potassium butoxide, potassium ethoxide, potassium methoxide, sodium butoxide, sodium ethoxide, sodium methoxide, lithium butoxide, lithium ethoxide and lithium methoxide.

Examples of alkaline earth metals compounds include alkaline earth metal hydroxides, such as beryllium hydroxide, magnesium hydroxide, calcium hydroxide, strontium hydroxide, barium hydroxide and radium hydroxide; alkaline earth metal carbonates, such as beryllium carbonate, magnesium carbonate, calcium carbonate, strontium carbonate, barium carbonate and radium carbonate; and alkaline earth metal hydrogencarbonates, such as beryllium hydrogencarbonate, magnesium hydrogencarbonate, calcium hydrogencarbonate, strontium hydrogencarbonate, barium hydrogencarbonate and radium hydrogencarbonate.

Examples of nitrogen compounds include ammonia and various amines.

Among the above-exemplified alkalis, sodium hydroxide and potassium hydroxide are preferred.

The above-mentioned alkalis can be used individually or in combination.

With respect to the acid used for the hydrolysis of the nitrile mixture, there is no particular limitation so long as it exhibits acid property in an aqueous solution thereof. Examples of acids include inorganic acids, such as hydrochloric acid, sulfuric acid and nitric acid; and organic acids, such as carboxylic acids and sulfonic acids.

When the hydrolysis of the nitrile mixture is performed using an aqueous alkali solution, there is no particular limitation with respect to the alkali concentration of the aqueous alkali solution. However, the alkali concentration of the aqueous alkali solution is generally in the range of from 1.0 to 50% by weight. When the hydrolysis is performed using, for example, sodium hydroxide as an alkali under atmospheric pressure, the alkali concentration of the aqueous alkali solution is generally in the range of from 2.0 to 40.0% by weight, preferably from 10.0 to 30.0% by weight. When the alkali concentration of the aqueous alkali solution is less than 1.0% by weight, the rate of the hydrolysis is lowered. On the other hand, when the alkali concentration of the aqueous alkali solution is more than 50.0% by weight, the solubility of 1,3,6-tricyanohexane in the aqueous phase, which is the site for the reaction of 1,3,6-tricyanohexane, is extremely lowered and, hence, the rate of the hydrolysis is likely to be markedly lowered.

The equivalent ratio of the alkali to 1,3,6-tricyanohexane is theoretically 1.00 or more in terms of the equivalent ratio of the hydroxyl ion in the alkali to the cyano group in 1,3,6-tricyanohexane. However, for obtaining a satisfactory rate of the hydrolysis, there is generally used an equivalent ratio in the range of from 1.01 to 3.00, preferably from 1.05 to 2.00. When the equivalent ratio is more than 3.00, the alkali remains in an excess amount in the hydrolysis reaction system, so that a large burden is likely to be imposed for removing the alkali present in an excess amount.

In the hydrolysis by using the above-mentioned alkali, a mixture of alkali salts of polycarboxylic acids is produced.

When the hydrolysis of the nitrile mixture is performed using an acid, the acid concentration of the aqueous acid solution varies depending on the type of the acid. However, the acid concentration is generally in the range of from 1 to 98% by weight. For example, when hydrochloric acid is used as the acid, the acid concentration of the hydrochloric acid is generally in the range of from 2 to 37% by weight, preferably from 20 to 37% by weight. When the acid concentration of the hydrochloric acid is less than 2.0% by weight, the rate of the hydrolysis is likely to be lowered. On the other hand, when the acid concentration of the hydrochloric acid is more than 37% by weight, it becomes difficult to obtain such a hydrochloric acid having a high acid concentration in an amount which is sufficient for a commercial scale production of the polycarboxylic acid mixture. When sulfuric acid is used as the acid, the acid concentration of the aqueous sulfuric acid solution is generally in the range of from 2 to 85% by weight, preferably from 20 to 60% by weight. When the acid concentration of the aqueous sulfuric acid solution is less than 2% by weight, the rate of the hydrolysis is likely to be lowered. On the other hand, when the acid concentration of the aqueous sulfuric acid solution is more than 85% by weight, the following disadvantage is likely to occur. When the aqueous sulfuric acid solution has a sulfuric acid concentration as high as more than 85% by weight, the amount of water necessary for the intended hydrolysis inevitably becomes small. Therefore, for achieving an amount of water which is sufficient for the hydrolysis, too large an amount of sulfuric acid is needed.

The equivalent ratio of the acid to 1,3,6-tricyanohexane is generally in the range of from 1.01 to 5.0, preferably from 1.05 to 3.0, in terms of the ratio of the acid to the cyano group in 1,3,6-tricyanohexane. When the equivalent ratio is less than 1.01, the rate of the hydrolysis is unpractically low. On the other hand, when the equivalent ratio is more than 5.0, an excess amount of the acid remains unreacted in the reaction system and, hence, a step for removing the acid becomes necessary.

In either of the case where the hydrolysis is performed using an alkali and the case where the hydrolysis is performed using an acid, the temperature for the hydrolysis is generally in the range of from 50 to 250° C., preferably from 80 to 140° C. When the hydrolysis reaction temperature is lower than 50° C., the rate of the hydrolysis is lowered. When the hydrolysis reaction temperature is higher than 250° C., a disadvantage is likely to occur wherein side reactions, such as decomposition, occur. The hydrolysis reaction time is generally in the range of from 1 to 200 hours. With respect to the hydrolysis reaction pressure, there is no particular limitation and the hydrolysis may be performed under superatmospheric pressure, atmospheric pressure or reduced pressure.

With respect to the atmosphere for the hydrolysis of the nitrile mixture, there is no particular limitation so long as no side reaction occur. For example, the hydrolysis may be performed in an atmosphere of an inert gas (such as nitrogen) or in air. When the hydrolysis is performed under atmospheric pressure, the reactor used for the hydrolysis may have an apparatus for cooling water which has been vaporized to recycle the resultant cooled water to the hydrolysis reaction system or have an apparatus for causing the liquid phase to bubble using a gas, such as nitrogen or air, thereby purging ammonia dissolved in the liquid phase from the hydrolysis reaction system. When the hydrolysis is performed under superatmospheric pressure, it is preferred that the reactor is equipped with an apparatus for purging by-produced ammonia from the hydrolysis reaction system.

In the present invention, the hydrolysis of the nitrile mixture may be either a one-step reaction or a two-step reaction. For example, when an amide is present as an intermediate in the hydrolysis reaction system after the hydrolysis using an alkali, an additional hydrolysis may be performed using another alkali or an acid.

The aqueous solution of a hydrolysis reaction mixture obtained by the hydrolysis of the nitrile mixture contains, as an impurity, nitrogen in the form of a compound thereof. For example, when the hydrolysis is performed using an acid, the aqueous hydrolysis reaction mixture solution contains an ammonium salt of the acid in an amount which is equivalent to that of the cyano group in the 1,3,6-tricyanohexane which is present before the hydrolysis is performed. On the other hand, when the hydrolysis of the nitrile mixture is performed using an alkali, ammonia is generated and a part of the ammonia is dissolved in the aqueous hydrolysis reaction mixture solution. If desired, before adjusting, in step (1), the pH value of the aqueous hydrolysis reaction mixture solution to a level in the range of from 3 to 13, such a nitrogen compound as an impurity may be separated from the aqueous hydrolysis reaction mixture solution.

With respect to a method for separating, before step (1), a nitrogen compound as an impurity from the aqueous hydrolysis reaction mixture solution, explanations are made below, taking as an example the case where the hydrolysis is performed using an acid. When the hydrolysis is performed using an acid, a polycarboxylic acid mixture is produced and an ammonium salt is also generated as an impurity. As an example of a method for separating the ammonium salt from the polycarboxylic acid mixture, there can be mentioned a method in which the solvent is removed from the hydrolysis reaction mixture, the polycarboxylic acid mixture is dissolved into another solvent which can dissolve the polycarboxylic acid mixture, and the polycarboxylic acid mixture is separated from the ammonium salt. In this case, the amount of the ammonium salt contained in the aqueous hydrolysis reaction mixture solution is preferably 0.01% by weight or less, more preferably 0.001% by weight or less, based on the weight of the polycarboxylic acid mixture in the aqueous hydrolysis reaction mixture solution.

In step (1) of the method of the present invention, the pH value of the aqueous hydrolysis reaction mixture solution (which mixture comprises the polycarboxylic acid mixture or a salt thereof) obtained by the above-mentioned hydrolysis is adjusted to a level in the range of from 3 to 13, thereby obtaining an aqueous solution containing a salt of the polycarboxylic acid mixture. The salt of the polycarboxylic acid mixture may contain a small amount of the polycarboxylic acid mixture. In step (2) of the method of the present invention, the aqueous solution obtained in step (1) is treated with a solid adsorbent for the purpose of effecting decoloration of the aqueous solution because the above-mentioned aqueous hydrolysis reaction mixture solution is generally markedly discolored.

The term "solid adsorbent" means a substance exhibiting no fluidity but maintaining the form of a solid at 25° C. and also at the temperature at which an adsorption treatment is performed, wherein the substance has an interface which causes a positive adsorption. Specific examples of solid adsorbents include oxides and hydroxides of metals, such as aluminum, iron, titanium, silicon and tin; activated carbon; bentonite; activated clay; diatomaceous earth; zeolites; hydrotalcites; cation exchange resins; and anion exchange resins. Examples of the above-mentioned oxides and hydroxides of aluminum, iron, titanium, silicon and tin include activated alumina, silica gel and titanium oxide. In the present invention, activated carbon, activated alumina and silica gel are preferred, because they exhibit high decoloration efficiency.

These solid adsorbents may be used individually or in combination. When two or more types of solid adsorbents are used in combination, these solid adsorbents may be used either simultaneously or individually. With respect to the morphology and size of the solid adsorbent, there is no particular limitation.

With respect to the amount of the solid adsorbent, there is no particular limitation so long as the polycarboxylic acid mixture of the present invention can be obtained. However, the amount of the solid adsorbent is generally from 0.01 to 500 parts by weight, preferably from 0.1 to 100 parts by weight, more preferably from 0.1 to 50 parts by weight, relative to 100 parts by weight of the above-mentioned salt of the polycarboxylic acid mixture. When the amount of the solid adsorbent is less than 0.01 part by weight, the decoloration effect is not satisfactory. On the other hand, when the amount of the solid adsorbent is more than 500 parts by weight, the decoloration effect is satisfactory, but the yield of the polycarboxylic acid mixture is likely to be lowered.

In step (2), the pH value of the above-mentioned aqueous hydrolysis reaction mixture solution to be treated with a solid adsorbent is very important. When the hydrolysis is performed using an alkali, the pH value of the aqueous hydrolysis reaction mixture solution is generally more than 13. On the other hand, when the hydrolysis is performed using an acid, the pH value of the aqueous hydrolysis reaction mixture solution is generally less than 3. When an aqueous hydrolysis reaction mixture solution having such a pH value is directly treated with a solid adsorbent, it is likely that the decoloration efficiency is lowered and the polycarboxylic acid mixture of the present invention having excellent color tone cannot be obtained.

With respect to the method for adjusting the pH value of the aqueous hydrolysis reaction mixture solution, there is no particular limitation. Examples of methods for adjusting the pH value of the aqueous hydrolysis reaction mixture solution include a method in which an inorganic acid (such as hydrochloric acid, sulfuric acid or nitric acid), an organic acid (such as acetic acid or 1,3,6-hexanetricarboxylic acid) or an alkali metal hydroxide (such as sodium hydroxide or potassium hydroxide) is added to the aqueous hydrolysis reaction mixture solution; and a method in which the aqueous hydrolysis reaction mixture solution is contacted with an ion exchange resin.

With respect to the period of time for the treatment with a solid adsorbent, there is no particular limitation so long as the polycarboxylic acid mixture of the present invention can be obtained. The treatment time is generally from 1 minute to 10 hours, preferably from 5 minutes to 5 hours, more preferably from 10 minutes to 2 hours. When the treatment time is less than 1 minute, the decoloration effect is likely to be unsatisfactory. On the other hand, when the treatment time is more than 10 hours, the decoloration effect is satisfactory, but the production efficiency is lowered. With respect to the method for adsorption by a solid adsorbent, there is no particular limitation. Examples of such adsorption methods include a method in which a solid adsorbent is added to the aqueous solution containing the polycarboxylic acid mixture, followed by stirring; and a method in which the above-mentioned aqueous solution is introduced into a column which is packed with a solid adsorbent.

With respect to the concentration of the polycarboxylic acid mixture or a salt thereof in the above-mentioned aqueous solution to be treated with a solid adsorbent, there is no particular limitation. However, the concentration is generally in the range of from 0.02 to 2.0 mol/l, preferably from 0.1 to 1.5 mol/l. When the concentration is less than 0.02 mol/l, the amount of the aqueous solution to be treated is large and the recovery of the polycarboxylic acid mixture or a salt thereof becomes difficult, leading to a lowering of the yield of the polycarboxylic acid mixture or a salt thereof. On the other hand, when the concentration is more than 2.0 mol/l, a mixture comprising the polycarboxylic acid mixture and a salt thereof is deposited and the adsorption of a discolored substance by the solid adsorbent becomes unsatisfactory.

With respect to the temperature for the treatment with a solid adsorbent, there is no particular limitation so long as the above-mentioned salt of the polycarboxylic acid mixture is not solidified or decomposed. For example, when activated carbon is used as a solid adsorbent and water is used as a solvent, the treatment temperature is generally in the range of from 5 to 100° C.

With respect to the method for separating and removing the solid adsorbent which remains in the aqueous solution after the adsorption treatment, there is no particular limitation, and the separation and removal can be performed by a conventional method (such as filtration) which is generally employed in the art.

In step (3), the salt of a polycarboxylic acid mixture in the treated aqueous solution obtained in step (2) is converted to a polycarboxylic acid mixture using an ion exchange resin, an electrodialyzer or an acid, thereby obtaining an aqueous solution containing a polycarboxylic acid mixture. In step (4), the polycarboxylic acid mixture is recovered from the aqueous solution obtained in step (3). In step (3), when the conversion of the salt of a polycarboxylic acid mixture to a polycarboxylic acid mixture is performed using an ion exchange resin or an electrodialyzer, a nitrogen compound which has remained as an impurity in the treated aqueous solution obtained in step (2) is removed simultaneously with the conversion of the salt of a polycarboxylic acid mixture to a polycarboxylic acid mixture.

In step (3), the pH value of the treated aqueous solution is adjusted to a level lower than 3 to thereby convert the salt of a polycarboxylic acid mixture in the aqueous solution to a polycarboxylic acid mixture. When the pH value of the aqueous solution is 3 or more, a polycarboxylic acid in the aqueous solution contains a salt or partial salt thereof with a basic compound and the content of a free carboxylic acid in the aqueous solution is low.

The pH value of the aqueous solution is adjusted to a level which is lower than 3, preferably lower than 2.5. The adjusted pH value varies depending on the total concentration of the polycarboxylic acids in the aqueous solution; however, it is more preferred that the pH value of the aqueous solution is adjusted to a level lower than 2.3.

The acid used in step (3) for adjusting the pH value of the aqueous solution may be either an inorganic acid or an organic acid. Examples of inorganic acids include sulfuric acid, hydrochloric acid and nitric acid. Examples of organic acids include carboxylic acids, such as formic acid and acetic acid; and sulfonic acids, such as methanesulfonic acid. When the adjustment of the pH value of the aqueous solution to level lower than 3 is performed using any one of the above-mentioned inorganic acids and organic acids, it is necessary to separate free polycarboxylic acids (which is formed by the addition of the acid for adjusting the pH value of the aqueous solution) from salts derived from the acid for adjusting the pH value of the aqueous solution. As the acid for adjusting the pH value of the aqueous solution, an inorganic acid is preferred, because an inorganic acid generally has a high acidity and, hence, the amounts of free polycarboxylic acids which are formed by the addition of the acid are likely to be large.

When the conversion of the salt of a polycarboxylic acid mixture to a polycarboxylic acid mixture is performed using an inorganic acid, for separating a by-produced inorganic salt from the aqueous solution containing the polycarboxylic acid mixture, the aqueous solution is subjected to an extraction with a solvent for the polycarboxylic acid mixture to obtain the polycarboxylic acid mixture as an extract with the organic solvent. By the extraction, a nitrogen compound which has remained in the aqueous solution is removed together with the above-mentioned inorganic salt. Examples of extraction solvents include tert-butyl methyl ether and tetrahydrofuran. Other solvents which exhibit the same performance as those of the above-mentioned solvents can also be used. With respect to the aqueous solution containing the polycarboxylic acid mixture, it is also possible to perform the following operation. The aqueous solution is subjected to distillation under heating and reduced pressure to obtain a completely dry residue. The residue is subjected to an extraction with an organic solvent for the polycarboxylic acid mixture to obtain the polycarboxylic acid mixture as an extract with the organic solvent. Examples of organic solvents used for the extraction include ethers, such as tetrahydrofuran, 1,4-dioxane, ethylene glycol dimethyl ether and tert-butyl methyl ether; ketones, such as acetone, methyl ethyl ketone and methyl isobutyl ketone; acetates, such as methyl acetate and ethyl acetate; carbonates, such as dimethyl carbonate and diethyl carbonate; and nitrites, such as acetonitrile and propionitrile. These organic solvents can be used individually or in combination.

With respect to the method for extraction, there is no particular limitation, and a conventional method, such as an extraction by stirring or an extraction using a Soxhlet's extractor, can be used.

The solvent can be removed from the extract to recover the polycarboxylic acid mixture, wherein, if desired, prior to the removal of the solvent from the extract, the extract is dried using a drying agent, such as magnesium sulfate anhydride.

In step (3), when the conversion of the salt of a polycarboxylic acid mixture to a polycarboxylic acid mixture is performed using a cation exchange resin, the ion exchange can be preferably performed in a batchwise manner or a continuous manner. However, the manner in which the ion exchange is performed is not limited to the above-mentioned manners. Examples of cation exchange resins include a resin (manufactured and sold by Mitsubishi Chemical Corporation, Japan) which is produced by introducing a sulfonic acid group to an aromatic ring of a styrene/divinylbenzene copolymer. This resin is, prior to use, treated with an acid to regenerate the resin. Representative examples of cation exchange resins of this type include strongly acidic cation exchange resins, such as Diaion SK102, SK104, SK106, SK1B, SK110, SK112, SK116 and SK1BN (trade names; manufactured and sold by Mitsubishi Chemical Corporation, Japan). It is also possible to use sulfonic acid type strongly acidic cation exchange resins, such as Amberlyst 15WET, 16WET, 31WET and 35WET (trade names; manufactured and sold by Rohm and Haas Co., U.S.A.). With respect to the type of the cation exchange resin, there is no particular limitation.

With respect to the case where an electrodialyzer is used in step (3) (that is, step (3) is performed by electrodialysis), explanations are given below. The electrodialysis is performed as follows. The aqueous solution of the salt of a polycarboxylic acid mixture is caused to be flowed in or circulate through compartments in the electrodialyzer, wherein the compartments are partitioned by ion exchange membranes. A voltage is applied to the electrodialyzer to remove a basic component from the aqueous solution through the ion exchange membranes, thereby lowering the pH value of the aqueous solution to a level lower than 3 to thereby convert the salt of a polycarboxylic acid mixture to a polycarboxylic acid mixture.

In the present invention, the electrodialysis is preferably performed using an electrodialyzer having conventional ion exchange membranes. Examples of electrodialyzers having conventional ion exchange membranes include an electrodialyzer which has cation exchange membranes but has no anion exchange membranes; an electrodialyzer having cation exchange membranes and anion exchange membranes; an electrodialyzer having cation exchange membranes and bipolar membranes (amphoteric membranes), an electrodialyzer having anion exchange membranes and bipolar membranes; and an electrodialyzer having cation exchange membranes, anion exchange membranes and bipolar membranes.

As a preferred example of an electrodialysis using an electrodialyzer which has cation exchange membranes but has no anion exchange membranes, there can be mentioned a method disclosed in Unexamined Japanese Patent Application Laid-Open Specification No. Sho 50-111010. As a preferred example of an electrodialysis using an electrodialyzer having cation exchange membranes and anion exchange membranes, there can be mentioned a method disclosed in Unexamined Japanese Patent Application Laid-Open Specification No. Hei 2-115025. As a preferred example of an electrodialysis using an electrodialyzer having cation exchange membranes and bipolar membranes, there can be mentioned a method disclosed in Patent Application Prior-to-Examination Publication (Kohyo) No. Hei 7-507598. As a preferred example of an electrodialysis using an electrodialyzer having anion exchange membranes and bipolar membranes, there can be mentioned a method disclosed in Unexamined Japanese Patent Application Laid-Open Specification No. Hei 8-281077.

With respect to the material for an ion exchange membrane used in the electrodialysis, there is no particular limitation so long as the material is generally used in the art. For example, fluorinated olefin resins, styrene/divinylbenzene copolymer resins, olefin resins and chlorinated olefin resins can be used as a material for an ion exchange membrane.

In the case of a material for a cation exchange membrane, it is preferred to use a material obtained by adding, to any one of the materials exemplified above as the materials which are generally used in the art, at least one group having a negative charge, such as a sulfonic acid group or a carboxyl group. On the other hand, in the case of a material for an anion exchange membrane, it is preferred to use a material obtained by adding, to any one of the materials exemplified above as the materials which are generally used in the art, at least one functional group, such as a quaternary ammonium group, a primary amino group, a secondary amino group or a tertiary amino group.

Further, as a bipolar membrane, there can be used a bipolar membrane produced by a conventional method. As an example of a conventional method for producing a bipolar membrane, there can be mentioned a method in which a cation exchange membrane and an anion exchange membrane are laminated through a curable adhesive or a binder (such as a paste containing a thermoplastic resin). Examples of methods using a curable adhesive include a method in which a polyethyleneimine/epichlorohydrin mixture is used as a curable adhesive (see Examined Japanese Patent Application Publication No. Sho 32-3962); and a method using a curable adhesive having an ion-exchange group, wherein the adhesive, upon curing, takes a cured structure which is ion exchangeable and has conductivity (see Examined Japanese Patent Application Publication No. Sho 34-3961). Further examples of bipolar membranes include a membrane produced by a method in which vinyl pyridine and an epoxy compound are applied onto one surface of a cation exchange membrane, followed by curing using radiation (see Examined Japanese Patent Application Publication No. Sho 38-16633); a membrane produced by a method in which a sulfonic acid type polymer electrolyte and an allylamine are attached to the surface of an anion exchange membrane, followed by ionization radiation to effect crosslinking (see Examined Japanese Patent Application Publication No. Sho 51-4113); a membrane produced by a method in which onto a surface of a first ion exchange membrane is attached a resin mixture obtained by dispersing a second ion exchange resin (having a charge which is opposite to that of the first ion exchange membrane) in a base polymer (see Examined Japanese Patent Application Publication No. Sho 53-37190); a membrane produced by a method in which a sheet produced by impregnation-copolymerization of a polyethylene film with styrene or divinyl benzene is inserted in a metal frame (such as a metal frame made of stainless steel), a surface of the sheet (which surface is not contacted with the metal frame) is sulfonated, the sheet is released from the metal frame, the other surface of the film (which is not sulfonated) is chloromethylated and, then, aminated (see U.S. Pat. No. 3,562,139); and a membrane produced by a method in which a specific type of a metal ion is applied onto both a surface of an anion exchange membrane and a surface of a cation exchange membrane, the anion exchange membrane and the cation exchange membrane are put upon another so that the metal ion-applied surfaces of the cation exchange membrane and anion exchange membrane face each other, followed by pressing (see Electro Chemica Acta Vol. 31, pages 1175 to 1176 (1986)).

As an electrode used in the electrodialysis, there can be mentioned a conventional electrode. Preferred examples of anodes include platinum, a titanium/platinum alloy, carbon, nickel, a ruthenium/titanium alloy and an illidium/titanium alloy. Preferred examples of cathodes include iron, nickel, platinum, a titanium/platinum alloy, carbon and stainless steel. The above-mentioned electrodes may have a conventional morphology, such as a bar, a plate, a mesh or a lattice shape.

In the present invention, when only a cation exchange membrane is used as an ion exchange membrane, the electrodialysis is performed as follows. A space between the anode and cathode is partitioned by cation exchange membranes so that a plurality of compartments are formed. The aqueous solution comprising a salt of a carboxylic acid mixture, and an aqueous solution of a mineral acid (such as sulfuric acid or hydrochloric acid) are circulated through the compartments so that compartments containing the aqueous solution comprising a salt of a carboxylic acid mixture are arranged alternately with compartments containing the aqueous solution of a mineral acid. Electrodialysis is performed so that an aqueous solution comprising a polycarboxylic acid mixture having a pH value of less than 3 and an aqueous mineral acid salt solution are, respectively, produced in alternately averaged compartments therefor.

When a bipolar membrane is used in combination with a cation exchange membrane, it is possible to employ a method in which a mineral acid is introduced to alternate compartments as mentioned above so as to react the mineral acid with a free alkali which is obtained from the aqueous solution of a salt of a polycarboxylic acid mixture, thereby converting the salt of a polycarboxylic acid mixture to a polycarboxylic acid mixture, as in the case where only a cation exchange membrane is used as an ion exchange membrane. Alternatively, it is also possible to employ a method in which an alkali (which is obtained from the aqueous solution comprising a salt of a polycarboxylic acid mixture) is recovered as an aqueous solution of the alkali without using a mineral acid. This method is especially preferred because the recovered aqueous alkali solution can be reused in the hydrolysis of the nitrile mixture.

With respect to the ion exchange membrane used in the electrodialysis, the cut-off molecular weight thereof is generally 2,000 or less, preferably 1,000 or less, more preferably 300 or less. With respect to the term "cut-off molecular weight", an explanation is given below, taken as an example the case where the ion exchange membrane has a cut-off molecular weight of 300. A 1% by weight aqueous solution of polyethylene glycol having a specific molecular weight is contacted with one surface of the ion exchange membrane, whereas distilled water is contacted with the other surface of the ion exchange membrane. Each of the aqueous solution and the distilled water is individually stirred at 25° C. under atmospheric pressure for 1 hour. The polyethylene glycol is diffused into the distilled water. The amount of polyethylene glycol diffused into the distilled water is measured. If the amount of the polyethylene glycol diffused is 5% by weight, based on the weight of the polyethylene glycol in the aqueous solution of polyethylene glycol having a molecular weight of 300, the ion exchange membrane is defined to have a cut-off molecular weight of 300. When the cut-off molecular weight of the ion exchange membrane is more than 2,000, a free polycarboxylic acid which is formed by the electrodialysis is likely to leak through the ion exchange membrane, leading to a lowering of the yield of the polycarboxylic acid mixture.

In view of not only the range of the temperature at which neither a salt or partial salt of a polycarboxylic acid mixture nor a free polycarboxylic acid does deposit, but also the heat resistance of the ion exchange membrane, the electrodialysis temperature is generally in the range of from 5 to 80° C., preferably from 10 to 60° C.

In the electrodialysis, the current density is generally in the range of from 0.1 to 100 $A/cm^2$, preferably from 0.2 to 50 $A/cm^2$.

In the present invention, the mutually adjacent ion exchange membranes may be disposed at a distance which is generally prescribed in the art. The distance between the mutually adjacent ion exchange membranes is generally in the range of from 0.01 to 10 mm, preferably from 0.05 to 1.50 mm.

In the present invention, the electrodialysis may be performed either in a batchwise manner or in a continuous manner.

By the above-mentioned method, the polycarboxylic acid mixture comprised mainly of 1,3,6-hexanetricarboxylic acid can be obtained. If it is intended to increase the content of 1,3,6-hexanetricarboxylic acid in the polycarboxylic acid mixture, and also intended to enhance the heat stability and color tone of the polycarboxylic acid mixture, it is preferred to purify the polycarboxylic acid mixture by a crystallization method in which the polycarboxylic acid mixture is dissolved in a solvent selected from the group consisting of water, an organic solvent and a mixture thereof, and the resultant solution is cooled or concentrated to deposit a crystal.

Examples of organic solvents used for the crystallization method include ethers, such as tetrahydrofuran, 1,4-dioxane, ethylene glycol dimethyl ether and tert-butyl methyl ether; ketones, such as acetone, methyl ethyl ketone and methyl isobutyl ketone; acetates, such as methyl acetate and ethyl acetate; carbonates, such as dimethyl carbonate and diethyl carbonate; nitriles, such as acetonitrile and propionitrile; hydrocarbons, such as toluene, xylene, n-hexane and cyclohexane; halogenated hydrocarbons, such as methylene chloride, chloroform and chlorobenzene; and carboxylic acids, such as acetic acid and propionic acid. These solvents can be used individually or in combination.

As examples of methods for crystallization, there can be mentioned a method in which the polycarboxylic acid mixture is uniformly dissolved in a solvent at a temperature which is equal to or lower than the boiling point of the solvent, followed by cooling or concentration to thereby deposit a crystal; and a method in which the polycarboxylic acid mixture is dissolved in a first solvent (such as acetone) in which the polycarboxylic acid mixture has high solubility, the resultant solution is then introduced into a second solvent in which the polycarboxylic acid mixture has low solubility, to thereby deposit a crystal of the polycarboxylic acid at room temperature, wherein the deposition can be facilitated by cooling or concentration.

The thus obtained crystal can be recovered by filtration. With respect to the method for filtration, there is no particular limitation. It is preferred to employ any of filtration under superatmospheric pressure, filtration under reduced pressure, centrifugal separation, and filtration using pressing.

The polycarboxylic acid mixture having been purified by the above-mentioned crystallization is advantageous in that, when the carboxylic acid mixture is used in the field of paints in which the carboxylic acid mixture is required to be cured by heating, discoloration of the polycarboxylic acid mixture during the curing thereof can be effectively suppressed.

The above-mentioned crystallization can be applied to the aqueous solution obtained in step (3).

The polycarboxylic acid mixture of the present invention can be advantageously used as a curing agent for a compound having two or more epoxy groups in a molecule thereof. That is, in another aspect of the present invention, there is provided a curable composition comprising: (a) compound having two or more epoxy groups in a molecule thereof, and (b) a curing agent comprising the polycarboxylic acid mixture of the present invention.

The curable composition of the present invention has a high curing rate and is advantageous not only in that a cured composition obtained by curing the curable composition has excellent mechanical properties, but also in that discoloration of the curable composition during the curing thereof can be effectively suppressed.

In the present invention, the curing agent (b) means a substance which can be reacted with an epoxy group to form a crosslinked structure. For example, the polycarboxylic acid mixture of the present invention as such can be used as the curing agent (b). Alternatively, the curing agent (b) may be a mixture of the polycarboxylic acid mixture of the present invention and another curing agent. Examples of curing agents other than the polycarboxylic acid mixture of the present invention include carboxylic acid compounds, acid anhydrides and amines.

Examples of carboxylic acid compounds include aliphatic, aromatic and alicyclic compounds having two or more carboxyl groups in a molecule thereof. Specific examples of such carboxylic compounds include suberic acid, sebacic acid, azelaic acid, decanedicarboxylic acid, cyclohexanedicarboxylic acid, isophthalic acid, trimellitic acid, tetrahydrophthalic acid, hexahydrophthalic acid, 1,2,4-butanetricarboxylic acid, a copolymer comprising acrylic acid or methacrylic acid, a polyester resin having a carboxyl group in a terminal thereof, and a polyamide resin having a carboxyl group in a terminal thereof.

Examples of acid anhydrides include maleic anhydride, phthalic anhydride, tetrahydrophthalic anhydride, hexahydrophthalic anhydride and trimellitic anhydride.

As an amine, there can be used a compound having at least one amino group in a molecule thereof. Examples of amines include ethylenediamine, diethylenetetramine, triethylenetetramine and hexamethylenediamine.

With respect to the content of the polycarboxylic acid mixture of the present invention in the curing agent (b), there is no particular limitation. However, when it is intended to improve the crosslinking density of a cured composition obtained by curing the curable composition, the content of the polycarboxylic acid mixture in the curing agent (b) is generally 10% by weight or more, preferably 50% by weight or more.

When it is intended to use the polycarboxylic acid mixture of the present invention for the curable composition, the content of 1,3,6-hexanetricarboxylic acid in the polycarboxylic acid mixture is preferably 90% by weight or more, more preferably 95% by weight or more, most preferably 98% by weight or more.

With respect to the epoxy compound (a) (i.e., compound having two or more epoxy groups in a molecule thereof) used in the curable composition of the present invention, explanations are given.

The term "epoxy group" means a 3-membered ring structure having a carbon-carbon-oxygen linkage. The carbon-carbon linkage in the carbon-carbon-oxygen linkage may be either a part of a straight chain or branched hydrocarbon or a part of a cyclic hydrocarbon having a 5- or 6-membered ring, wherein each of the straight chain or branched hydrocarbon and the cyclic hydrocarbon may have bonded thereto a halogen atom (such as a fluorine atom, a chlorine atom or a bromine atom) or a functional group (such as a hydroxyl group). Further, a carbon atom forming the epoxy group may have bonded thereto an alkyl group (such as a methyl group) or a halogen atom.

Examples of epoxy groups include a glycidyl group and an alicyclic epoxy group. Among these epoxy groups, a glycidyl group is preferred.

With respect to the structure of the epoxy compound (a), there is no particular limitation so long as the epoxy compound (a) has two or more epoxy groups in a molecule thereof. The epoxy compound (a) may be either a low molecular weight compound having a molecular weight of less than 1,000 or a high molecular weight compound having a molecular weight of 1,000 or more. Further, the epoxy compound (a) may be a polymer.

Examples of epoxy compounds (a) include a compound having an epoxy group (such as a glycidyl group) bonded to an ether linkage or an ester linkage; a compound having an epoxy group bonded to a nitrogen atom; and a polymer containing an epoxy group. Depending on the use and desired properties of the curable composition of the present invention, the above-mentioned epoxy compounds can be used individually or in combination.

Examples of epoxy compounds having a glycidyl group bonded to an ether linkage include ethylene glycol diglycidyl ether, propanediol diglycidyl ether, butanediol diglycidyl ether, hydrogenated bisphenol A diglycidyl ether, diglycidyl ether obtained from hydroquinone, diglycidyl ether obtained from bisphenol A, diglycidyl ether obtained from tetramethyldihydroxybiphenyl, glycidyl ethers obtained from phenolic novolak resins and cresylic novolak resins, and halogenation products of these compounds. Among them, diglycidyl ether obtained from bisphenol A is preferred not only because the diglycidyl ether can be used in various application fields in the form of a liquid or solid, wherein the form of the diglycidyl ether varies depending on the molecular weight thereof, but also because the diglycidyl ether is generally commercially available as "bisphenol A type epoxy resin".

Examples of low molecular weight epoxy compounds having a glycidyl group bonded to an ester linkage include diglycidyl phthalate, diglycidyl maleate, diglycidyl terephthalate, diglycidyl isophthalate, diglycidyl naphthalenedicarboxylate, diglycidyl biphenyldicarboxylate, diglycidyl succinate, diglycidyl fumarate, diglycidyl glutarate, diglycidyl adipate, diglycidyl suberate, diglycidyl sebacate, diglycidyl decandicarboxylate, diglycidyl cyclohexanedicarboxylate, triglycidyl trimellitate, glycidyl esters obtained from dimmer acids, and halogenation products and oligomers of these compounds.

Examples of epoxy compounds having a glycidyl group bonded to a nitrogen atom include triglycidyl isocyanurate, tetraglycidyl diaminodiphenylmethane, triglycidyl aminophenol, diglycidyl aniline, diglycidyl toluidine, tetraglycidyl methaxylenediamine, tetraglycidyl hexamethylenediamine, tetraglycidyl bisaminomethylcyclohexane, glycidyl compounds obtained from hydantoin compounds, and halogenation products and oligomers of these compounds.

Examples of alicyclic epoxy compounds include bis(3,4-epoxycyclohexyl)adipate, bis(3,4-epoxycyclohexyl)terephthalate, 3,4-epoxycyclohexyl-3,4-epoxycyclohexane carboxylate, 3,4-epoxycyclohexylmethyl-3,4-epoxycyclohexane carboxylate, bis(3,4-epoxycyclohexylmethyl)oxalate, bis(3,4-epoxy-6-methylcyclohexyl)adipate, bis(3,4-epoxycyclohexylmethyl)pimelate, and vinylcyclohexene dioxide.

Examples of polymers having an epoxy group include a polymer which has an epoxy group (such as a glycidyl group) in a terminal, a side chain or a branched chain thereof and which has a weight average molecular weight of from 800 to 5,000,000. Specific examples of epoxy group-having polymers include a resin having a polyester skeleton, a resin having a polyamide skeleton and a homopolymer or copolymer of a monomer having a polymerizable unsaturated double bond.

From the viewpoint of using the curable composition of the present invention for a paint or the like, the above-mentioned polymer having an epoxy group is preferred, and the above-mentioned homopolymer or copolymer of a monomer having a polymerizable unsaturated double bond is more preferred. This polymer is a polymer produced by polymerizing at least one monomer having an epoxy group or a copolymer produced by copolymerizing a monomer having an epoxy group and a monomer having no epoxy group.

Examples of monomers having both a polymerizable unsaturated double bond and an epoxy group include glycidyl esters of (meth)acrylic acid and methylglycidyl esters of (meth)acrylic acid, such as glycidyl (meth)acrylate and β-methylglycidyl (meth)acrylate; a glycidyl ether and methylglycidyl ether of an allylalcohol; N-glycidyl acrylate amide; and glycidyl vinylsulfonate. In the present invention, the term "(meth)acrylic acid" means any one of acrylic acid and methacrylic acid.

Examples of monomers which have a polymerizable, unsaturated double bond but have no epoxy group and which are copolymerizable with the above-mentioned monomer having an epoxy group include acrylic monomers, such as esters of (meth)acrylic acid and esters of (meth)acrylic acid having a hydroxyl group. Monomers other than acrylic monomers can also be used. Examples of esters of (meth)acrylic acid include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, hexyl (meth)acrylate, cyclohexyl (meth)acrylate, 2-ethylhexyl (meth)acrylate, octyl (meth)acrylate, 2-ethyloctyl (meth)acrylate, benzyl (meth)acrylate, dodecyl (meth)acrylate, phenyl (meth)acrylate and stearyl (meth)acrylate. Examples of esters of acrylic acid which have a hydroxyl group include 2-hydroxyethyl (meth)acrylate, 2-hydroxypropyl (meth)acrylate and 2-hydroxycyclohexyl (meth)acrylate. Examples of monomers (other than mentioned above) which are copolymerizable with a monomer having an epoxy group include hydrocarbons, such as styrene, α-methylstyrene and vinyltoluene; nitrites, such as acrylonitrile and methacrylonitrile; amides, such as acrylamide, methacylamide and methylolacrylamide; esters, such as dialkyl esters of fumaric acid and dialkyl esters of itaconic acid; vinyloxazoline; vinyl acetate; vinyl propionate; lauryl vinyl ether; vinyl monomers having a halogen atom; and vinyl monomers having a silicon atom.

In the curable composition of the present invention, as the epoxy compound (a), it is preferred to use a glycidyl group-containing acrylic resin especially in the field of a paint which is used in the outdoor, because a cured composition obtained by the curable composition has excellent durability (such as excellent weatherability or excellent abrasion resistance). In the present invention, the term "glycidyl group-containing acrylic resin" means an acrylic resin having a glycidyl group. Preferred examples of glycidyl group-containing acrylic resin include a copolymer comprised mainly of methyl methacrylate and glycidyl methacrylate, and a copolymer comprised mainly of methyl methacrylate, glycidyl methacrylate and styrene.

With respect to a glycidyl group-containing polymer for use in a paint, the number average molecular weight thereof is preferably in the range of from 1,000 to 100,000. From the viewpoint of the excellent film-forming properties of the paint, the excellent smoothness of a film obtained from the paint, and the excellent kneadability with the curing agent (b), the number average molecular weight of the glycidyl group-containing polymer is more preferably from 1,000 to 30,000, still more preferably from 1,500 to 20,000.

In the present invention, the number average molecular weight of a compound is measured by gel permeation chromatography (GPC) using a calibration curve obtained with respect to monodisperse standard polystyrene samples and, hence, is obtained as a value relative to that of the monodisperse standard polystyrene samples used.

In the present invention, the epoxy equivalent of the epoxy compound (a) is generally in the range of from 85 to 10,000 g/eq; however, it is not required that the epoxy equivalent of the epoxy compound (a) be within the range. With respect to an epoxy compound comprising a glycidyl ether obtained from bisphenol A, the epoxy equivalent thereof is generally in the range of from 180 to 5,000 g/eq. On the other hand, with respect to a glycidyl group-containing acrylic resin, the epoxy equivalent thereof is generally in the range of from 200 to 5,000 g/eq, preferably from 300 to 2,500 g/eq.

In the curable composition of the present invention, with respect to the amount ratio of the epoxy compound (a) to the curing agent (b), it is preferred that the ratio is from 0.5 to 3 eq, more advantageously from 0.7 to 1.5, in terms of the equivalent ratio of the functional group in the curing agent (b) (which functional group can be reacted with the epoxy group in the epoxy compound (a)) to the epoxy group in the epoxy compound (a). When the above-mentioned amount ratio falls outside of the above-mentioned range, a disadvantage is likely to be caused wherein the gelation ratio and mechanical properties of a cured composition obtained by curing the curable composition of the present invention are lowered.

The curable composition of the present invention is produced by mixing the curing agent (b) and the epoxy compound (a). With respect to the method for producing the curable composition, there is no particular limitation. Examples of methods for producing the curable composition include a method in which a mixture of the curing agent (b) and the epoxy compound (a) is kneaded at room temperature or while heating; and a method in which a mixture of the curing agent (b) and the epoxy compound (a) is dispersed or dissolved in water or an organic solvent, and, optionally, the water or organic solvent is removed from the resultant solution.

In the production of the curable composition of the present invention, it is possible that to the epoxy compound (a) is added, as the curing agent (b), a mixture of the polycarboxylic acid mixture of the present invention and another curing agents. It is also possible that to the epoxy compound (a) are individually added the polycarboxylic acid mixture and another curing agent.

If desired, the curable composition of the present invention may have incorporated therein an additive. Examples of additives include curing accelerators; reactive diluents; fillers and reinforcing agents; flame-retardants, such as antimony trioxide, bromine compounds and aluminum hydroxide; dyes and pigments; mold release agents and fluidity adjusting agents; plasticizers; antioxidants; ultraviolet absorbers; light stabilizers; anti-foaming agents; leveling agents; colorants; titanium dioxide; and solvents. With respect to the amount of the additive, there is no particular limitation so long as the effect of the present invention is not impaired. With respect to the method for incorporating an additive to the curable composition, there is no particular limitation and a conventional blending method can be employed.

Examples of curing accelerators include imidazoles, such as 2-ethyl-4-methyl imidazole, 2-methyl imidazole and 1-benzyl-2-methyl imidazole; tertiary amines, such as dimethylcyclohexylamine, benzyldimethylamine and tris(diaminomethyl)phenol; diazabicyclo alkenes and salts thereof, such as 1,8-diazabicyclo(5,4,0)undec-7-ene; organometal compounds, such as zinc octylate, tin octylate and aluminum/acetyl acetone complex; organic phosphorus compounds, such as triphenyl phosphine and triphenyl phosphite; boron compounds, such as boron trifluoride, boron trifluoride/diethyl ether complex, boron trifluoride/piperidine complex and triphenyl borate; metal halides, such as zinc chloride and stannic chloride; quaternary ammonium compounds; and alkali metal alcoholates, such as 2,4-dihydroxy-3-hydroxy-methylpentane sodium alcoholate; and phenolic compounds, such as anacardic acid and salts thereof, cardol, cardanol, phenol, nonylphenol and cresol.

Examples of reactive diluents include butyl glycidyl ether, allyl glycidyl ether, 2-ethylhexyl glycidyl ether, styrene oxide, phenyl glycidyl ether, cresyl glycidyl ether, p-sec-butylphenyl glycidyl ether, glycidyl methacrylate and glycidyl tert-carboxylate.

Examples of fillers and reinforcing agents include coal tar, bitumen, woven cloth, glass fiber, asbestos fiber, boron fiber, carbon fiber, aromatic polyamide fiber, mineral silicate, mica, quartz powder, aluminum hydroxide, bentonite, kaolin, silica aerogel, and metal powder (such as aluminum powder or iron powder).

Examples of mold release agents and fluidity adjusting agents include silicone, aerosyl, colloidal aluminum silicate containing water, wax, stearates, calcium carbonate and talc.

Examples of plasticizers include pine oil, fluid polymer having low viscosity, rubbery materials, tar, polysulfide, urethane prepolymer, polyol, diethyl phthalate, dibutyl phthalate, polymers of epichlorhydrine, dioctyl phthalate, dioctyl adipate and tricresyl phosphate.

Examples of ultraviolet absorbers include Tinuvin (trade name; manufactured and sold by Ciba Specialty Chemicals, Switzerland). Examples of steric hindrance amine type light stabilizers include Tinuvin 144 (trade name; manufactured and sold by Ciba Specialty Chemicals, Switzerland). Examples of phenol type antioxidants include IRGANOX 1010 and IRGAFOS P-EPQ (trade names; manufactured and sold by Ciba Specialty Chemicals, Switzerland). With respect to the method for blending the above-mentioned additive, there is no particular limitation and a blending conventional method can be used.

Examples of pigments include azo pigments; copper phthalocyanine pigments; basic lakes and acid lakes for in-mold decorating; pigments for mordant dye; pigments for construction dye; quinacridone pigments; dioxazine pigments; color pigments, such as carbon black, a chromic acid salt, ferrocyanides, titanium oxide, selenium sulfides, a silicic acid salt, a carbonic acid salt, a phosphoric acid salt and metal powder; and extender pigments, such as barium sulfate, barium carbonate, gypsum, alumina white, clay, silica, talc, calcium silicate and magnesium carbonate.

Examples of additives (other than mentioned above) include dryers, such as cobalt naphthenate; anti-skinning agents, such as methoxyphenol and cyclohexanone oxime; thickening agents, such as high polymeric linseed oil, organic bentonite and silica; anti-boiling agents, such as benzoin; and flow modifiers.

The curable composition of the present invention can be cured by heating or ultraviolet radiation. For example, when the curing of the curable composition is performed by heating, the curing temperature is generally in the range of from room temperature to 250° C., preferably from 80 to 200° C., more preferably from 80 to 150° C. The curing time varies depending the formulation the curable composition; however, the curing time is generally from several seconds to 200 hours.

The curable composition of the present invention can be advantageously used for a paint, an electricity insulating material, an adhesive, a matrix resin for a composite material, and a sealant. In the case of an electricity insulating material, the composition can be used, for example, as a material for cast molding, a sealing agent for a semiconductor, an insulating coating and a lamination sheet.

The curable composition of the present invention can be advantageously used especially for a coating, such as a powder coating, a water-dispersed slurry coating, an aqueous coating or a solvent type coating. When a glycidyl group-containing acrylic resin is used as the epoxy compound (a), the curable composition has high curing rate and excellent durability, such as weatherability. When such a curable composition contains no pigment, the curable composition can be advantageously used for a clear coating, such as a coating for a top coat for a vending machine, a road material or an automobile.

A coating obtained from the curable composition of the present invention has excellent durability (such as weatherability) and can be advantageously used (as a protective coating for a metal, a concrete precursor, a wood and a plastic) for a can, an automobile, a ship and a construction material.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, various measurements and analyses were performed by the following methods.

1. Methods for Analyzing the Characteristics of a Nitrile Mixture

The composition of a nitrile mixture is determined by gas chromatography (GC) or gel permeation chromatography (GPC). The content of the polynitrile compound (i.e., nitrile compound containing 4 or more cyano groups) in a trinitrile mixture is measured by GPC. The color tone of the nitrile mixture is measured by UV spectrophotometry using a transmission method. The measurements are performed using the following apparatus under the following conditions.

[Gas Chromatography]

0.5 g of the nitrile mixture is dissolved in 1.5 g of acetone. With respect to the resultant solution, gas chromatography is performed under the following conditions.

Apparatus: GC-14 B (trade name; manufactured and sold by Shimadzu Corporation, Japan)

Column: capillary column TC-1 (trade name;

manufactured and sold by GL Science Inc., Japan) (inner diameter: 0.25 mm, column length: 30 m)

Carrier gas: helium

Detector: hydrogen flame ionization detector (FID)

Column temperature: the column temperature is elevated from 120° C. to 200° C. at an elevation rate of 20° C./min, maintained at 200° C. for 5 minutes, elevated from 200° C. to 250° C. at an elevation rate of 10° C./min, and maintained at 250° C. for 10 minutes.

Solvent for the sample: acetone

[Gel Permeation Chromatography (GPC)]

2.0 mg of the nitrile mixture is dissolved in 2.0 g of tetrahydrofuran. The resultant solution is subjected to filtration using a filter having a mesh size of 0.5 μm to thereby obtain a sample solution. With respect to the thus obtained sample solution, GPC is performed under the following conditions.

Apparatus: HLC-8120GPC (trade name; manufactured and sold by Tosoh Corporation, Japan)

Detector: refractive index detector (RI)

Developing solution: tetrahydrofuran

Flow rate of developing solution: 1.0 ml/min

Column: TSKgel™ GMH$_{HR}$-N and G1000H$_{XL}$ (trade name; each manufactured and sold by Tosoh Corporation, Japan)

One GMH$_{HR}$-N column and two G1000H$_{XL}$ columns are connected in series.

Column temperature: 40° C.

[Measurement of the Color Tone]

0.400 g of the nitrile mixture is dissolved in 4.0 ml of diethylene glycol ether, wherein the volume of the diethylene glycol ether is determined by a transfer pipette, to thereby obtain a sample solution. With respect to the obtained sample solution, UV spectrophotometry is performed in accordance with a transmission method under the below-described conditions to thereby obtain the X, Y and Z tristimulus values of the sample. From the obtained X, Y and Z tristimulus values, the psychometric lightness L-value, the psychometric chroma a-value and the psychometric chroma b-value are calculated by the Hunter's color difference equation.

Apparatus: UV2500PC (trade name; manufactured and sold by Shimadzu Corporation, Japan)

Sample cell: made of quartz; outer size: 12.4 mm×12.4 mm×45 mm; optical path: 10.0 mm Reagent: diethylene glycol dimethyl ether (manufactured and sold by Wako Pure Chemical Industries, Ltd., Japan; reagent of special grade)

Temperature for measurement: 25±2° C.

Range of wave length for measurement: from 380 to 780 nm

Change rate of wave length for measurement: low rate range (about 140 nm/min)

2. Methods for Analyzing the Characteristics of a Polycarboxylic Acid Mixture

The contents of 1,3,6-hexanetricarboxylic acid, 3-carboxymethyl-1,5-dicarboxypentane and adipic acid in a polycarboxylic acid mixture are measured by high performance liquid chromatography (hereinafter, frequently referred to as "LC"). The color tone of the polycarboxylic acid mixture is measured by UV spectrophotometry in accordance with a transmission method. The nitrogen content of the polycarboxylic acid mixture is calculated from the nitrogen concentration of a gas which is generated when the polycarboxylic acid mixture is burned. The above-mentioned measurements are performed by means of the below-described apparatuses under the below-described conditions. With respect to the content of sodium (Na) in the polycarboxylic acid mixture, the measurement thereof is performed by ion chromatography (Na is derived from sodium hydroxide used for the hydrolysis of the nitrile mixture).

[LC Measurement]

In the case where the polycarboxylic acid mixture is present in the form of a solid, the LC measurement is performed as follows. 0.050 g of the polycarboxylic acid mixture and 0.015 g of isobutylic acid (as an internal standard) are dissolved in 2.00 g of a developing solution described below to thereby obtain a sample solution. With respect to the obtained sample solution, LC measurement is performed under the below-mentioned conditions. In the case where the polycarboxylic acid mixture is present in the form of a solution thereof, the LC measurement is performed as follows. A certain amount of the polycarboxylic acid mixture (wherein the amount of the polycarboxylic acid mixture is 0.25 g when the concentration of the polycarboxylic acid mixture in the solution is about 20% by weight), and 0.015 g of isobutylic acid (as an internal standard) are dissolved in 2.0 g of a developing solution described below to thereby obtain a sample solution. With respect to the obtained sample solution, LC measurement is performed under the below-mentioned conditions.

Before the above-mentioned sample solution is subjected to LC, 0.015 g of isobutylic acid (as an internal standard), 0.015 g of 1,3,6-hexanetricarboxylic acid and certain amounts of adipic acid are accurately weighed and dissolved in 2.0 g of distilled water to thereby obtain a solution. This solution is subjected to LC to obtain the peak strength ratio of 1,3,6-hexanetricarboxylic acid to isobutylic acid, and the peak strength ratio of adipic acid to isobutylic acid. Using the obtained peak strength ratios, the contents (% by weight) of 1,3,6-hexanetricarboxylic acid and adipic acid in the polycarboxylic acid mixture are calculated. With respect to 3-carboxymethyl-1,5-dicarboxypentane (which is derived from 3-cyanomethyl-1,5-dicyanopentane), the content of this compound in the polycarboxylic acid mixture is calculated on the assumption that the peak strength ratio of 3-carboxymethyl-1,5-dicarboxypentane to isobutylic acid is same as that of 1,3,6-hexanetricarboxylic acid to isobutylic acid.

Apparatus:
Column: FinePack SIL C-18S (trade name; manufactured and sold by JASCO Corporation, Japan)
  inner diameter: 4.6 mm
  column length: 150 mm
Detector: SPD-6A (trade name; manufactured and sold by Shimadzu Corporation, Japan)
Developing solution: a mixture of acetonitrile ($CH_3CN$), distilled water and a 85% by weight aqueous phosphoric acid solution, wherein the acetonitrile/distilled water/aqueous phosphoric acid solution weight ratio is 10/990/4
Column temperature: 40° C.
Flow rate of developing solution: 1.2 ml/min
Sample volume: 25 μl

[Measurement of the Color Tone]

0.400 g of a polycarboxylic acid mixture is dissolved in 4.0 ml of distilled water, wherein the volume of the distilled water is determined by a transfer pipette, to thereby obtain a sample solution. With respect to the obtained sample solution, UV spectrophotometry is performed in accordance with a transmission method under the below-described conditions to thereby obtain the X, Y and Z tristimulus values of the sample. From the obtained X, Y and Z tristimulus values, the psychometric lightness L-value, the psychometric chroma a-value and the psychometric chroma b-value are calculated by the Hunter's color difference equation.

Apparatus: UV2500PC (trade name; manufactured and sold by Shimadzu Corporation, Japan)
Sample cell: made of quartz; outer size: 12.4 mm×12.4 mm×45 mm; optical path: 10.0 mm
Reagent: distilled water (manufactured and sold by Wako Pure Chemical Industries, Ltd., Japan)
Temperature for measurement: 25±2° C.
Range of wave length for measurement: from 380 to 780 nm
Change rate of wave length for measurement: low rate range (about 140 nm/min)

[Measurement of Nitrogen Content]

A solid containing a polycarboxylic acid mixture is placed on a sample boat made of quartz and burned to thereby obtain a gas. With respect to the obtained gas, the nitrogen content thereof is measured under the below-described conditions. For the measurement, a calibration curve is obtained with respect to an aqueous solution containing 392 ppm of propionitrile (which solution contains 100 ppm of nitrogen) and an aqueous solution containing 3,920 ppm of propionitrile (which solution contains 1,000 ppm of nitrogen). The concentration of the polycarboxylic acid mixture in the solid is adjusted so that the range of the nitrogen concentration of the gas falls within the range (from 100 to 392 ppm) of the nitrogen concentration in the above-mentioned calibration curve.

Apparatus: Total nitrogen analyzer TN-10 (trade name; manufactured and sold by Mitsubishi Chemical Industries, Ltd., Japan)
Carrier gas: argon (Ar)
Condition for burning: the sample is burned first at 600° C. for 10 seconds and then at 800° C. for 30 seconds.

[Measurement of Sodium Content]

The polycarboxylic acid mixture is dissolved in distilled water to obtain, as a sample solution, an aqueous solution of the polycarboxylic acid mixture. With respect to the obtained aqueous solution, the sodium content thereof is measured by ion chromatography using a column filled with a cation exchange resin under the below-described conditions. For the measurement, a calibration curve is obtained with respect to two aqueous sodium hydroxide solutions having different sodium hydroxide concentrations. Using the obtained calibration curve, the sodium content of the aqueous solution of the polycarboxylic acid mixture is calculated.

Apparatus: 8020 series (trade name; manufactured and sold by Tosoh Corporation, Japan)
Detector: conductivity meter CM-8020 (trade name; manufactured and sold by Tosoh Corporation., Japan)
Developing solution: 2 mmol/l aqueous nitric acid solution
Column: IC-Cation (trade name; manufactured and sold by Tosoh Corporation, Japan)
Column temperature: 40° C.
Flow rate of developing solution: 0.5 ml/min
Sample volume: 10 μl

EXAMPLE 1

[Production of Nitrile Mixture]

Using a single electrolytic cell, an electrodimerization reaction of acrylonitrile was performed as follows.

In the single electrolytic cell, the cathode was comprised of a lead alloy having a conductive surface area of 1 cm×90 cm, and the anode was comprised of carbon steel having the same conductive surface area as that of the lead alloy. The anode and cathode were held at a distance of 2 mm. As an electrolytic liquid, there was used an emulsion composed of 10 parts by weight of an oil phase and 90 parts by weight of an aqueous phase. The aqueous phase was comprised of an aqueous solution having the following composition: about 2.0% by weight of acrylonitrile, about 10% by weight of $K_2HPO_4$, about 3% by weight of $K_2B_4O_7$, 0.3% by weight of ethyltributylammonium ethyl sulfate, 0.3% by weight of adiponitrile, 0.1% by weight of propionitrile and 0.05% by weight of 1,3,6-tricyanohexane. The pH value of the aqueous solution had been adjusted to about 8 using phosphoric acid. In the emulsion, a dissolution equilibrium had been achieved between the aqueous phase and the oil phase. The oil phase contained about 28% by weight of acrylonitrile and about 62% by weight of adiponitrile.

The above-mentioned emulsion as the electrolytic liquid was circulation-supplied to the single electrolytic cell so that the linear velocity of the emulsion became 1 m/sec at the electrolysis surface, and an electrolysis was performed at an electric current density of 20 A/dm$^2$ at 50° C. Simultaneously with the start of the electrolysis, the aqueous phase of the emulsion, which emulsion was sent to an oil/water separator from an electrolytic liquid tank, was treated at a rate of 6 cc/Ah with 200 cc of a K$^+$ form of an iminodiacetato chelate resin (trade name: Lewatit TP207; manufactured and sold by Bayer AG, Germany) maintained at about 50° C., and the treated aqueous phase was circulated to the electrolytic liquid tank.

At the same time, the oil phase was continuously withdrawn from the electrolytic cell and then from the oil/water separator, and fresh acrylonitrile and fresh water were supplied to the electrolytic cell so that the electrolytic liquid maintained the above-mentioned composition. Ethyltributylammonium ethyl sulfate contained in the aqueous phase was dissolved in the oil phase and withdrawn from the electrolytic cell together with the oil phase. Therefore, for compensating for this loss of ethyltributylammonium ethyl sulfate, fresh ethyltributylammonium ethyl sulfate was occasionally supplied to the electrolytic cell.

The above-mentioned electrolysis was performed for 2,000 hours. In the electrolysis, the electrolysis voltage was initially 3.9 V, which was maintained stably at 3.9 V. The gas generated by the electrolysis had a hydrogen content of 0.16% by volume at completion of the electrolysis. The corrosion rates of the cathode and anode were 0.21 mg/Ah and 0.23 mg/Ah, respectively. No heterogeneous corrosion deposit was observed at the anode. The yields of adiponitrile and 1,3,6-tricyanohexane, relative to the consumed acrylonitrile, were 90% and 7.5%, respectively.

Subsequently, the withdrawn masses of oil phase were collected and subjected to extraction with water. From the extract were distilled off acrylonitrile, propionitrile and water, followed by distillation under reduced pressure to remove adiponitrile, thereby obtaining a liquid as a distillation residue. The obtained distillation residual liquid still contained 11.5% by weight of adiponitrile.

For removing the adiponitrile from the distillation residual liquid, the liquid was subjected to a batchwise distillation using a distillation column (inner diameter: 32 mm; number of plates: 5) equipped with a vacuum jacket under conditions wherein the degree of vacuum was 2.0 mmHg and the column top temperature was in the range of from 120 to 210° C. By the distillation, a fraction comprised mainly of adiponitrile was removed, and a distillation residue (A) was obtained.

The obtained distillation residue (A) was a nitrile mixture (B) comprised mainly of 1,3,6-tricyanohexane and contained 4.0% by weight of adiponitrile, 84.5% by weight of 1,3,6-tricyanohexane, 5.0% by weight of 3-cyanomethyl-1,5-dicyanopentane, and 6.5% by weight of a polynitrile compound.

For separating a nitrile mixture (having a 1,3,6-tricyanohexane content higher than that of the nitrile mixture (B)) from the distillation residue (A), the distillation residue (A) was subjected to a molecular distillation using a Smith type laboratory molecular distillation apparatus (type 2; manufactured and sold by Shinko Pfaudler Co., Ltd., Japan; electroheating area: 0.032 m$^2$; made of glass) under conditions wherein the degree of vacuum was 0.1 mmHg, the outer wall heating temperature was 180° C., and the supplying rate of the distillation residue (A) was 2 g/min. The amount of the distillation residue (A) fed to the apparatus was 2,000 g. By the distillation, a distillate and a distillation residue were obtained in amounts of 1,150 g and 850 g, respectively. The distillate was a yellow nitrile mixture (C) comprised of 93.3% by weight of 1,3,6-tricyanohexane, 5.8% by weight of 3-cyanomethyl-1,5-dicyanopentane and 0.9% by weight of adiponitrile.

The color tone of the above-obtained nitrile mixture (C) was measured. As a result, it was found that nitrile mixture (C) had a psychometric lightness L-value of 98.2, a psychometric chroma a-value of −1.18 and a psychometric chroma b-value of 3.68.

The above-mentioned operation was repeated two times (that is, the operation for obtaining the nitrile mixture (C) was performed three times in total), thereby obtaining 1,320 g of the nitrile mixture (C).

In the below-described Examples and Comparative Examples, the above-mentioned nitrile mixture (C) was used as 1,3,6-tricyanohexane.

[Production of Polycarboxylic Acid Mixture]

161 g of the nitrile mixture (C) and 780 g of a 20% by weight aqueous sodium hydroxide solution (which contained 3.9 mol of sodium hydroxide) were fed to a 1-liter four-necked flask equipped with a reflux condenser and a stirrer. The resultant mixture in the four-necked flask was heated under reflux for 24 hours to hydrolyze the nitrile mixture (C), followed by cooling to room temperature, thereby obtaining a hydrolysis reaction mixture (D) in an amount of 916 g.

To 916 g of the hydrolysis reaction mixture (D) was added a 36% by weight hydrochloric acid while cooling the hydrolysis reaction mixture (D) using ice so that the temperature of the hydrolysis reaction mixture (D) did not exceed 20° C., thereby adjusting the pH value of the hydrolysis reaction mixture (D) to 7 to obtain a neutralization reaction mixture (E) in an amount of 1,072 g. Subsequently, 28.2 g of an activated carbon (trade name: SHIRASAGI; grade: A; manufactured and sold by TAKEDA CHEMICAL INDUSTRIES, LTD., Japan) was added to the neutralization reaction mixture (E), followed by stirring at room temperature for 1 hour. Then, the activated carbon was removed from the resultant mixture by filtration, thereby obtaining a transparent, decolored reaction mixture (F) in an amount of 1,065 g.

Subsequently, the pH value of the decolored reaction mixture (F) was lowered to 1 using a 36% by weight hydrochloric acid, thereby converting a salt of a polycarboxylic acid mixture in the decolored reaction mixture (F) to a polycarboxylic acid mixture. Thus, an aqueous solution containing a polycarboxylic acid mixture was obtained. Then, water was removed from the aqueous solution by means of a rotary evaporator at about 90° C. under reduced pressure, thereby obtaining a solid. The obtained solid was dried at 40° C. under reduced pressure until the solid was completely dehydrated, thereby recovering a polycarboxylic acid mixture. The recovered polycarboxylic acid mixture was fed to a 10-liter vessel and 4,500 ml of tert-butyl methyl ether was added thereto, followed by stirring for 1 hour, thereby obtaining a polycarboxylic acid mixture as an extract with the tert-butyl methyl ether. A salt which had not been dissolved in the tert-butyl methyl ether was removed by filtration. To the extract (i.e., filtrate) was added 50 g of anhydrous magnesium sulfate, followed by stirring at 25° C. for 1 hour, thereby drying the extract. A precipitate was removed from the extract by filtration to thereby obtain a filtrate. The solvent (i.e., tert-butyl methyl ether) was distilled off from the obtained filtrate at 50° C. under reduced pressure by means of a rotary evaporator, thereby obtaining a residue. The obtained residue was dried at 40° C. under reduced pressure, thereby obtaining a colorless polycarboxylic acid mixture in an amount of 202.7 g. The yield of the actually obtained polycarboxylic acid mixture (hereinafter, this actual yield is referred to simply as a "yield"), relative to the theoretical yield of the polycarboxylic acid mixture (wherein the theoretical yield is calculated from the amount of the nitrile mixture (C) fed), was 93%.

The nitrogen content of the obtained polycarboxylic acid mixture was measured, and it was found that the polycarboxylic acid mixture had a nitrogen content of 561 ppm by weight. The composition of the polycarboxylic acid mixture was determined by LC (liquid chromatography), and it was found that the polycarboxylic acid mixture was comprised of 93.3% by weight of 1,3,6-hexanetricarboxylic acid, 5.8% by weight of 3-carboxymethyl-1,5-dicarboxypentane and 0.9% by weight of adipic acid.

The color tone of the polycarboxylic acid mixture was measured by the above-mentioned method. As a result, it was found that the polycarboxylic acid mixture had a psychometric lightness L-value of 99.90, a psychometric chroma a-value of −0.01 and a psychometric b-value of −0.12. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 100.00, a psychometric chroma a-value of −0.05 and a psychometric chroma b-value of 0.11. The color difference ΔE of the polycarboxylic acid mixture was 0.23, wherein the ΔE is an index for the thermal stability of the polycarboxylic acid mixture. Further, another sample of the polycarboxylic acid mixture was heated at 160° C. for 3 hours, and the color tone of the sample of the polycarboxylic acid mixture was measured by the above-mentioned method. As a result, it was found that the polycarboxylic acid mixture after heating at 160° C. for 3 hours had a psychometric lightness L-value of 97.33, a psychometric chroma a-value of −1.21 and a psychometric chroma b-value of 6.87. The color difference ΔE as calculated using the L-value of 97.33, the a-value of −1.21 and the b-value of 6.87 was 7.53.

EXAMPLE 2

1,065 g of a transparent, decolored reaction mixture (F) obtained in substantially the same manner as in Example 1 was flowed through a column packed with 4,000 ml of a styrene type cation exchange resin (trade name: AMBERLYST 15WET; manufactured and sold by Rohm and Haas Co., U.S.A.). The resultant ion-exchanged mixture in the column was withdrawn from the column by flowing distilled water through the column, thereby obtaining a solution. The obtained solution was filtered by means of a TFE filter (pore size: 1 μm) to obtain a filtrate, and then water was removed from the obtained filtrate at 90° C. by means of a rotary evaporator, thereby obtaining a residue. The obtained residue was completely dried at 40° C. under reduced pressure, thereby obtaining 200.6 g of a colorless polycarboxylic acid mixture (the yield of the polycarboxylic acid mixture: 92%).

The nitrogen content of the obtained polycarboxylic acid mixture was measured, and it was found that the polycarboxylic acid mixture had a nitrogen content of 327 ppm by weight. The composition of the polycarboxylic acid mixture was determined by LC (liquid chromatography), and it was found that the polycarboxylic acid mixture was comprised of 93.4% by weight of 1,3,6-hexanetricarboxylic acid, 5.7% by weight of 3-carboxymethyl-1,5-dicarboxypentane and 0.9% by weight of adipic acid.

The color tone of the polycarboxylic acid mixture was measured by the above-mentioned method. As a result, it was found that the polycarboxylic acid mixture had a psychometric lightness L-value of 99.86, a psychometric chroma a-value of 0.00 and a psychometric b-value of 0.25. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 99.60, a psychometric chroma a-value of −0.15 and a psychometric chroma b-value of 0.60. The color difference ΔE of the polycarboxylic acid mixture was 0.46, wherein the ΔE is an index for the thermal stability of the polycarboxylic acid mixture. Further, another sample of the polycarboxylic acid mixture was heated at 160° C. for 3 hours, and the color tone of the sample of the polycarboxylic acid mixture was measured by the above-mentioned method. As a result, it was found that the polycarboxylic acid mixture after heating at 160° C. for 3 hours had a psychometric lightness L-value of 98.14, a psychometric chroma a-value of −1.12 and a psychometric chroma b-value of 5.76. The color difference ΔE as calculated using the L-value of 98.14, the a-value of −1.12 and the b-value of 5.76 was 5.51.

EXAMPLE 3

100 g of a polycarboxylic acid mixture obtained in substantially the same manner as in Example 2 and 100 g of distilled water were fed to a 300 ml eggplant type flask. The polycarboxylic acid mixture was uniformly dissolved in the distilled water at 70° C., thereby obtaining a solution. The obtained solution was allowed to stand to cool the solution to 25° C. The solution was further allowed to stand at 25° C. to precipitate a crystal. From the start of the precipitation of the crystal, the temperature of the solution was lowered to 1° C. at a rate of 2° C./hr while appropriately shaking the flask. The crystal was placed in a bag made of a filter fabric (200 mesh) and filtered by means of a centrifugal filter at 3,000 rpm, thereby obtaining 81.3 g of a colorless polycarboxylic acid mixture (the yield of the polycarboxylic acid mixture: 75%).

The nitrogen content of the obtained polycarboxylic acid mixture was measured, and it was found that the polycarboxylic acid mixture had a nitrogen content of 65 ppm by weight. The composition of the polycarboxylic acid mixture was determined by LC (liquid chromatography), and it was found that the polycarboxylic acid mixture was comprised of 99.6% by weight of 1,3,6-hexanetricarboxylic acid, 0.2% by weight of 3-carboxymethyl-1,5-dicarboxypentane and 0.2% by weight of adipic acid.

The color tone of the polycarboxylic acid mixture was measured by the above-mentioned method. As a result, it was found that the polycarboxylic acid mixture had a psychometric lightness L-value of 99.61, a psychometric chroma a-value of −0.03 and a psychometric b-value of 0.02. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 99.58, a psychometric chroma a-value of 0.03 and a psychometric chroma b-value of 0.21. The color difference ΔE of the polycarboxylic acid mixture was 0.20, wherein the ΔE is an index for the thermal stability of the polycarboxylic acid mixture. Further, another sample of the polycarboxylic acid mixture was heated at 160° C. for 3 hours, and the color tone of the sample of the polycarboxylic acid mixture was measured by the above-mentioned method. As a result, it was found that the polycarboxylic acid mixture after heating at 160° C. for 3 hours had a psychometric lightness L-value of 99.12, a psychometric chroma a-value of −0.43 and a psychometric chroma b-value of 1.97. The color difference ΔE as calculated using the L-value of 99.12, the a-value of −0.43 and the b-value of 1.97 was 2.05.

EXAMPLE 4

207.1 g of a polycarboxylic acid mixture was obtained (the yield of the polycarboxylic acid mixture: 95%) in substantially the same manner as in Example 3, except that the pH value of a hydrolysis reaction mixture (D) obtained in substantially the same manner as in Example 1 was adjusted to 13 and the treatment with an activated carbon was performed with respect to the resultant mixture.

The nitrogen content of the obtained polycarboxylic acid mixture was measured, and it was found that the polycarboxylic acid mixture had a nitrogen content of 1,023 ppm by weight. The composition of the polycarboxylic acid mixture was determined by LC (liquid chromatography), and it was found that the polycarboxylic acid mixture was comprised of 93.3% by weight of 1,3,6-hexanetricarboxylic acid, 5.8% by weight of 3-carboxymethyl-1,5-dicarboxypentane and 0.9% by weight of adipic acid.

The color tone of the polycarboxylic acid mixture was measured by the above-mentioned method. As a result, it was found that the polycarboxylic acid mixture had a psychometric lightness L-value of 99.87, a psychometric chroma a-value of −0.09 and a psychometric b-value of 0.36. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 99.79, a psychometric chroma a-value of −0.11 and a psychometric chroma b-value of 0.58. The color difference ΔE of the polycarboxylic acid mixture was 0.24, wherein the ΔE is an index for the thermal stability of the polycarboxylic acid mixture. Further, another sample of the polycarboxylic acid mixture was heated at 160° C. for 3 hours, and the color tone of the sample of the polycarboxylic acid mixture was measured by the above-mentioned method. As a result, it was found that the polycarboxylic acid mixture after heating at 160° C. for 3 hours had a psychometric lightness L-value of 97.28, a psychometric chroma a-value of −1.39 and a psychometric chroma b-value of 7.43. The color difference ΔE as calculated using the L-value of 97.28, the a-value of −1.39 and the b-value of 7.43 was 7.64.

EXAMPLE 5

204.5 g of a polycarboxylic acid mixture was obtained (the yield of the polycarboxylic acid mixture: 94%) in substantially the same manner as in Example 3, except that the pH value of a hydrolysis reaction mixture (D) obtained in substantially the same manner as in Example 1 was adjusted to 12 and the treatment with an activated carbon was performed with respect to the resultant mixture.

The nitrogen content of the obtained polycarboxylic acid mixture was measured, and it was found that the polycarboxylic acid mixture had a nitrogen content of 959 ppm by weight. The composition of the polycarboxylic acid mixture was determined by LC (liquid chromatography), and it was found that the polycarboxylic acid mixture was comprised of 93.4% by weight of 1,3,6-hexanetricarboxylic acid, 5.7% by weight of 3-carboxymethyl-1,5-dicarboxypentane and 0.9% by weight of adipic acid.

The color tone of the polycarboxylic acid mixture was measured by the above-mentioned method. As a result, it was found that the polycarboxylic acid mixture had a psychometric lightness L-value of 99.80, a psychometric chroma a-value of −0.11 and a psychometric b-value of 0.29. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 99.79, a psychometric chroma a-value of −0.09 and a psychometric chroma b-value of 0.50. The color difference ΔE of the polycarboxylic acid mixture was 0.21, wherein the ΔE is an index for the thermal stability of the polycarboxylic acid mixture. Further, another sample of the polycarboxylic acid mixture was heated at 160° C. for 3 hours, and the color tone of the sample of the polycarboxylic acid mixture was measured by the above-mentioned method. As a result, it was found that the polycarboxylic acid mixture after heating at 160° C. for 3 hours had a psychometric lightness L-value of 97.22, a psychometric chroma a-value of −1.33 and a psychometric chroma b-value of 7.28. The color difference ΔE as calculated using the L-value of 97.22, the a-value of −1.33 and the b-value of 7.28 was 7.28.

EXAMPLE 6

203.4 g of a polycarboxylic acid mixture was obtained (the yield of the polycarboxylic acid mixture: 94%) in substantially the same manner as in Example 3, except that the pH value of a hydrolysis reaction mixture (D) obtained in substantially the same manner as in Example 1 was adjusted to 9 and the treatment with an activated carbon was performed with respect to the resultant mixture.

The nitrogen content of the obtained polycarboxylic acid mixture was measured, and it was found that the polycarboxylic acid mixture had a nitrogen content of 832 ppm by weight. The composition of the polycarboxylic acid mixture was determined by LC (liquid chromatography), and it was found that the polycarboxylic acid mixture was comprised of 93.3% by weight of 1,3,6-hexanetricarboxylic acid, 5.9% by weight of 3-carboxymethyl-1,5-dicarboxypentane and 0.8% by weight of adipic acid.

The color tone of the polycarboxylic acid mixture was measured by the above-mentioned method. As a result, it was found that the polycarboxylic acid mixture had a psychometric lightness L-value of 99.87, a psychometric chroma a-value of −0.11 and a psychometric b-value of 0.13. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 99.90, a psychometric chroma a-value of −0.08 and a psychometric chroma b-value of 0.43. The color difference ΔE of the polycarboxylic acid mixture was 0.31, wherein the ΔE is an index for the thermal stability of the polycarboxylic acid mixture. Further, another sample of the polycarboxylic acid mixture was heated at 160° C. for 3 hours, and the color tone of the sample of the polycarboxylic acid mixture was measured by the above-mentioned method. As a result, it was found that the polycarboxylic acid mixture after heating at 160° C. for 3 hours had a psychometric lightness L-value of 97.14, a psychometric chroma a-value of −1.27 and a psychometric chroma b-value of 7.03. The color difference ΔE as calculated using the L-value of 97.14, the a-value of −1.27 and the b-value of 7.03 was 7.51.

EXAMPLE 7

201.2 g of a polycarboxylic acid mixture was obtained (the yield of the polycarboxylic acid mixture: 93%) in substantially the same manner as in Example 3, except that the pH value of a hydrolysis reaction mixture (D) obtained in substantially the same manner as in Example 1 was adjusted to 5 and the treatment with an activated carbon was performed with respect to the resultant mixture.

The nitrogen content of the obtained polycarboxylic acid mixture was measured, and it was found that the polycarboxylic acid mixture had a nitrogen content of 684 ppm by weight. The composition of the polycarboxylic acid mixture was determined by LC (liquid chromatography), and it was found that the polycarboxylic acid mixture was comprised of 93.2% by weight of 1,3,6-hexanetricarboxylic acid, 5.8% by weight of 3-carboxymethyl-1,5-dicarboxypentane and 1.0% by weight of adipic acid.

The color tone of the polycarboxylic acid mixture was measured by the above-mentioned method. As a result, it was found that the polycarboxylic acid mixture had a psychometric lightness L-value of 99.96, a psychometric chroma a-value of −0.04 and a psychometric b-value of 0.00. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 99.88, a psychometric chroma a-value of −0.07 and a psychometric chroma b-value of 0.26. The color difference ΔE of the polycarboxylic acid mixture was 0.27, wherein the ΔE is an index for the thermal stability of the polycarboxylic acid mixture. Further, another sample of the polycarboxylic acid mixture was heated at 160° C. for 3 hours, and the color tone of the sample of the polycarboxylic acid mixture was measured by the above-mentioned method. As a result, it was found that the polycarboxylic acid mixture after heating at 160° C. for 3 hours had a psychometric lightness L-value of 97.29, a psychometric chroma a-value of −1.26 and a psychometric chroma b-value of 6.99. The color difference ΔE as calculated using the L-value of 97.29, the a-value of −1.26 and the b-value of 6.99 was 7.58.

EXAMPLE 8

198.6 g of a polycarboxylic acid mixture was obtained (the yield of the polycarboxylic acid mixture: 91%) in substantially the same manner as in Example 3, except that the pH value of a hydrolysis reaction mixture (D) obtained in substantially the same manner as in Example 1 was adjusted to 3 and the treatment with an activated carbon was performed with respect to the resultant mixture.

The nitrogen content of the obtained polycarboxylic acid mixture was measured, and it was found that the polycarboxylic acid mixture had a nitrogen content of 1,049 ppm by weight. The composition of the polycarboxylic acid mixture was determined by LC (liquid chromatography), and it was found that the polycarboxylic acid mixture was comprised of 93.3% by weight of 1,3,6-hexanetricarboxylic acid, 5.8% by weight of 3-carboxymethyl-1,5-dicarboxypentane and 0.9% by weight of adipic acid.

The color tone of the polycarboxylic acid mixture was measured by the above-mentioned method. As a result, it was found that the polycarboxylic acid mixture had a psychometric lightness L-value of 99.87, a psychometric chroma a-value of −0.09 and a psychometric b-value of 0.18. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 99.91, a psychometric chroma a-value of −0.12 and a psychometric chroma b-value of 0.47. The color difference ΔE of the polycarboxylic acid mixture was 0.30, wherein the ΔE is an index for the thermal stability of the polycarboxylic acid mixture. Further, another sample of the polycarboxylic acid mixture was heated at 160° C. for 3 hours, and the color tone of the sample of the polycarboxylic acid mixture was measured by the above-mentioned method. As a result, it was found that the polycarboxylic acid mixture after heating at 160° C. for 3 hours had a psychometric lightness L-value of 96.93, a psychometric chroma a-value of −1.41 and a psychometric chroma b-value of 7.93. The color difference ΔE as calculated using the L-value of 96.93, the a-value of −1.41 and the b-value of 7.93 was 8.39.

EXAMPLE 9

A hydrolysis reaction mixture (D) obtained in substantially the same manner as in Example 1 was subjected to electrodialysis for removing sodium (Na) using an electrodialyzer (trade name: TS2B-2-10 type; manufactured and sold by TOKUYAMA Corp., Japan) as follows. In the electrodialyzer, bipolar membranes (trade name: NEO-SEPTA BP-1; manufactured and sold by TOKUYAMA Corp., Japan) and K membranes (cation exchange membrane) were alternately arranged at an interval of 0.75 mm between an anode and a cathode (wherein a K membrane was disposed at both ends) to thereby form ten desalting compartments and ten alkali compartments, wherein each compartment was partitioned by one of the bipolar membranes and one of the K membranes, and wherein the desalting compartments and the alkali compartments were alternately disposed between the anode and cathode. The effective areas of the bipolar membrane and K membrane were each 2 dm$^2$ per one compartment. As each of the anode and cathode, a nickel electrode was used. The electrolysis was performed under conditions wherein the current applied was 27 A and the voltage applied was about 38 V. A tank for supplying the hydrolysis reaction mixture (D) to each desalting compartment (hereinafter, this tank is referred to as "salt tank"), and a tank for supplying an aqueous sodium hydroxide solution to each alkali compartment (hereinafter, this tank is referred to as "alkali tank") were provided in the outside of the above-mentioned compartments. 2,000 g of the hydrolysis reaction mixture (D), 6 liters of a 0.1 N aqueous sodium hydroxide solution and about 6 liters of a 1 N aqueous sodium hydroxide solution were fed to the salt tank, the alkali tank and the electrode compartments (i.e., anode and cathode compartments), respectively. The electrodialysis was performed for 18 minutes while circulating the hydrolysis reaction mixture (D) between the salt tank and each desalting compartment and circulating the 0.1 N aqueous sodium hydroxide solution between the alkali tank and each alkali compartment, each at a flow rate of 3.2 l/min (i.e., 6 cm/sec). By the electrodialysis, there was obtained 1,850 g of a neutralized solution (H) having a pH value of 7.0.

The neutralized solution (H) had an electrical conductance of 54.3 mS/cm. 45 g of an activated carbon (trade name: SHIRASAGI; grade: A; manufactured and sold by TAKEDA CHEMICAL INDUSTRIES, LTD., Japan) was added to the neutralized solution (H), followed by stirring at room temperature for 1 hour. Then, the activated carbon was removed from the resultant mixture by filtration, thereby obtaining a transparent, decolored neutralized solution (I) in an amount of 1,815 g. For performing another electrodialysis, the decolored neutralized solution (I) was fed to the above-mentioned salt tank. As an alkali solution for the alkali tank, the same aqueous sodium hydroxide solution as used in the above-mentioned electrodialysis for obtaining the neutralized solution (H) was used. The electrodialysis was performed for 50 minutes under conditions wherein the current applied was 27 A, the voltage applied was about 38 V and the flow rate was 3.2 l/min (i.e., 6 cm/sec), thereby obtaining 1,400 g of a colorless, transparent desalted solution (J). The electrical conductance of the desalted solution (J) as measured at completion of the electrodialysis was 1.15 mS/cm. The Na removing ratio, which is defined as the ratio of the Na concentration of the desalted solution (J) to the Na concentration of the hydrolysis reaction mixture (D) used in the electrodialysis treatment, was 99.7%.

The solution (J) was analyzed by LC (liquid chromatography), and it was found that the desalted solution (J) contained 461.2 g of 1,3,6-hexanetricarboxylic acid, 27.6 g of 3-carboxymethyl-1,5-dicarboxypentane and 4.3 g of adipic acid (the yield of the polycarboxylic acid mixture: 97%).

1,400 g of the desalted solution (J) was fed to a crystallization vessel equipped with a refrigeration medium circulating jacket. The internal temperature of the vessel was lowered to $-3°$ C. while stirring the contents of the vessel by means of a Teflon-coated stirring rod, followed by stirring for 24 hours, thereby precipitating a crystal. The precipitated crystal was removed by filtration using a PTFE filter (pore size: 1 µm), thereby obtaining a mother liquor. The obtained mother liquor was subjected to a centrifugal separation by means of a centrifugal separator (basket size: 130 φ) at 4,000 rpm for 20 minutes, thereby obtaining a crystal. The obtained crystal had a water content of 12%. The crystal was subjected to vacuum drying, thereby obtaining 228 g of a colorless polycarboxylic acid mixture.

The nitrogen content of the obtained polycarboxylic acid mixture was measured, and it was found that the polycarboxylic acid mixture had a nitrogen content of 36 ppm by weight. The composition of the polycarboxylic acid mixture was determined by LC (liquid chromatography), and it was found that the polycarboxylic acid mixture was comprised of 99.5% by weight of 1,3,6-hexanetricarboxylic acid, 0.3% by weight of 3-carboxymethyl-1,5-dicarboxypentane and 0.2% by weight of adipic acid.

The color tone of the polycarboxylic acid mixture was measured by the above-mentioned method. As a result, it was found that the polycarboxylic acid mixture had a psychometric lightness L-value of 99.97, a psychometric chroma a-value of $-0.37$ and a psychometric b-value of 0.01. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 99.91, a psychometric chroma a-value of $-0.29$ and a psychometric chroma b-value of 0.07. The color difference $\Delta E$ of the polycarboxylic acid mixture was 0.12, wherein the $\Delta E$ is an index for the thermal stability of the polycarboxylic acid mixture. Further, another sample of the polycarboxylic acid mixture was heated at 160° C. for 3 hours, and the color tone of the sample of the polycarboxylic acid mixture was measured by the above-mentioned method. As a result, it was found that the polycarboxylic acid mixture after heating at 160° C. for 3 hours had a psychometric lightness L-value of 99.27, a psychometric chroma a-value of $-0.35$ and a psychometric chroma b-value of 1.13. The color difference $\Delta E$ as calculated using the L-value of 99.27, the a-value of $-0.35$ and the b-value of 1.13 was 1.32.

EXAMPLE 10

To 914 g of a hydrolysis reaction mixture (D) obtained in substantially the same manner as in Example 1 was added 386.5 g of a 36% by weight hydrochloric acid so as to adjust the pH value of the hydrolysis reaction mixture (D) to 1. From the resultant mixture having a pH value of 1 was removed water by means of a rotary evaporator at a temperature of from 88 to 92° C. under reduced pressure, thereby obtaining a residue. The obtained residue was dried at 40° C. under reduced pressure, thereby obtaining a dried residue. The drying of the residue was performed to such a degree that the change in weight of the residue by drying the residue for 6 hours was not more than 0.01%. Subsequently, the dried residue was fed to a 10-liter vessel and 4,500 ml of tert-butyl methyl ether was added thereto, followed by stirring for 1 hour, thereby obtaining a polycarboxylic acid mixture as an extract with the tert-butyl methyl ether. A salt which had not been dissolved in the tert-butyl methyl ether was removed by filtration. To the extract (i.e., filtrate) was added 50 g of anhydrous magnesium sulfate, followed by stirring for 1 hour, thereby drying the extract. A precipitate was removed from the extract by filtration to thereby obtain a filtrate. The solvent (i.e., tert-butyl methyl ether) was distilled off from the obtained filtrate at 50° C. under reduced pressure by means of a rotary evaporator, thereby obtaining a residue. The obtained residue was dried at 40° C. under reduced pressure, thereby obtaining a polycarboxylic acid mixture in an amount of 213.2 g (the yield of the polycarboxylic acid mixture: 98%).

To 213.2 g of the thus obtained polycarboxylic acid mixture was added 303.6 g of distilled water, and the resultant mixture was heated at 45° C. to thereby dissolve the polycarboxylic acid mixture. To the resultant aqueous solution in an amount of 516.8 g was added 336 g of a 35% by weight aqueous sodium hydroxide solution while cooling the aqueous solution using ice so that the temperature of the resultant aqueous mixture was maintained at a temperature of 25° C. or lower, thereby adjusting the pH value of the aqueous mixture to 7. To the resultant neutralized aqueous mixture was added 10.7 g of an activated carbon (trade name: SHIRASAGI; grade: A; manufactured and sold by TAKEDA CHEMICAL INDUSTRIES, LTD., Japan), followed by stirring at room temperature for 1 hour. Then, the activated carbon was removed from the resultant aqueous mixture by filtration, thereby obtaining a decolored aqueous mixture in an amount of 810 g.

To 810 g of the obtained decolored aqueous mixture was added 386 g of a 36% by weight hydrochloric acid while cooling the decolored aqueous mixture using ice so that the temperature of the resultant aqueous mixture was maintained at a temperature of 25° C. or lower, thereby adjusting the pH value of the aqueous mixture to 1. From the resultant aqueous mixture having a pH value of 1 was removed water by means of a rotary evaporator at a temperature of from 88 to 92° C. under reduced pressure, thereby obtaining a residue. The obtained residue was dried at 40° C. under reduced pressure, thereby obtaining a dried residue. The drying of the residue was performed to such a degree that the change in weight of the residue by drying the residue for 6 hours was not more than 0.01%. Subsequently, the dried residue was fed to a 10-liter vessel and 4,500 ml of tert-butyl methyl ether was added thereto, followed by stirring for 1 hour, thereby obtaining a polycarboxylic acid mixture as an extract with the tert-butyl methyl ether. A salt which had not been dissolved in the tert-butyl methyl ether was removed by filtration. To the filtrate was added 50 g of anhydrous magnesium sulfate, followed by stirring for 1 hour, thereby drying the extract. A precipitate was removed from the extract by filtration to thereby obtain a filtrate. The solvent (i.e., tert-butyl methyl ether) was distilled off from the obtained filtrate at 50° C. under reduced pressure by means of a rotary evaporator, thereby obtaining a residue. The obtained residue was dried at 40° C. under reduced pressure, thereby obtaining a polycarboxylic acid mixture in an amount of 196.7 g (the yield of the polycarboxylic acid mixture: 91%).

The nitrogen content of the obtained polycarboxylic acid mixture was measured, and it was found that the polycarboxylic acid mixture had a nitrogen content of 480 ppm by weight. The composition of the polycarboxylic acid mixture was determined by LC (liquid chromatography), and it was found that the polycarboxylic acid mixture was comprised of 93.3% by weight of 1,3,6-hexanetricarboxylic acid, 5.8% by weight of 3-carboxymethyl-1,5-dicarboxypentane and 0.9% by weight of adipic acid.

The color tone of the polycarboxylic acid mixture was measured by the above-mentioned method. As a result, it was found that the polycarboxylic-acid mixture had a psychometric lightness L-value of 99.91, a psychometric chroma a-value of −0.02 and a psychometric b-value of 0.14. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 99.99, a psychometric chroma a-value of −0.06 and a psychometric chroma b-value of 0.10. The color difference ΔE of the polycarboxylic acid mixture was 0.23, wherein the ΔE is an index for the thermal stability of the polycarboxylic acid mixture. Further, another sample of the polycarboxylic acid mixture was heated at 160° C. for 3 hours, and the color tone of the sample of the polycarboxylic acid mixture was measured by the above-mentioned method. As a result, it was found that the polycarboxylic acid mixture after heating at 160° C. for 3 hours had a psychometric lightness L-value of 97.86, a psychometric chroma a-value of −1.17 and a psychometric chroma b-value of 6.34. The color difference ΔE as calculated using the L-value of 97.86, the a-value of −1.17 and the b-value of 6.34 was 6.63.

EXAMPLE 11

161 g of the nitrile mixture (C) obtained in Example 1 and 395.4 g of a 36% by weight hydrochloric acid (which contained 3.9 mol of hydrogen chloride) were fed to a 1-liter four-necked flask equipped with a reflux condenser. The resultant mixture in the four-necked flask was heated under reflux for 24 hours to hydrolyze the nitrile mixture (C) while stirring the contents of the flask by means of a Teflon-coated rotator which was operated by a magnetic stirrer, thereby obtaining a hydrolysis reaction mixture.

The obtained hydrolysis reaction mixture was cooled to room temperature and allowed to stand for 12 hours. Subsequently, water was removed from the hydrolysis reaction mixture by means of a rotary evaporator at a temperature of about 90° C. under reduced pressure, thereby obtaining a residue. The obtained residue was dried at 40° C. under reduced pressure, thereby obtaining a dried residue. The drying of the residue was performed to such a degree that the change in weight of the residue by drying the residue for 6 hours was not more than 0.01%. Subsequently, the dried residue was fed to a 10-liter vessel and 4,500 ml of tert-butyl methyl ether was added thereto, followed by stirring for 1 hour, thereby obtaining a polycarboxylic acid mixture as an extract with the tert-butyl methyl ether. A salt which had not been dissolved in the tert-butyl methyl ether was removed by filtration. To the extract (i.e., filtrate) was added 50 g of anhydrous magnesium sulfate, followed by stirring for 1 hour, thereby drying the extract. A precipitate was removed from the extract by filtration to thereby obtain a filtrate. The solvent (i.e., tert-butyl methyl ether) was distilled off from the obtained filtrate at 50° C. under reduced pressure by means of a rotary evaporator, thereby obtaining a residue. The obtained residue was dried at 50° C. under reduced pressure, thereby obtaining a polycarboxylic acid mixture in an amount of 212.1 g (the yield of the polycarboxylic acid mixture: 98%). The drying of the residue was performed to such a degree that the change in weight of the residue by drying the residue for 6 hours was not more than 0.01%.

To 212.1 g of the thus obtained polycarboxylic acid mixture was added 302.4 g of distilled water, and the resultant mixture was heated at 45° C. to thereby dissolve the polycarboxylic acid mixture. To the resultant aqueous solution in an amount of 514.5 g was added 336.0 g of a 35% by weight aqueous sodium hydroxide solution while cooling the aqueous solution using ice so that the temperature of the resultant aqueous mixture was maintained at a temperature of 25° C. or lower, thereby adjusting the pH value of the aqueous mixture to 7. To the resultant neutralized aqueous mixture was added 10.7 g of an activated carbon (trade name: SHIRASAGI; grade: A; manufactured and sold by TAKEDA CHEMICAL INDUSTRIES, LTD., Japan), followed by stirring at room temperature for 1 hour. Then, the activated carbon was removed from the resultant aqueous mixture by filtration, thereby obtaining a decolored aqueous mixture in an amount of 809 g.

To 809 g of the obtained decolored aqueous mixture was added 385 g of a 36% by weight hydrochloric acid while cooling the decolored aqueous mixture using ice so that the temperature of the resultant aqueous mixture was maintained at a temperature of 25° C. or lower, thereby adjusting the pH value of the aqueous mixture to 1. From the resultant aqueous mixture having a pH value of 1 was removed water by means of a rotary evaporator at a temperature of about 90° C. under reduced pressure, thereby obtaining a residue. The obtained residue was dried at 40° C. under reduced pressure, thereby obtaining a dried residue. The drying of the residue was performed to such a degree that the change in weight of the residue by drying the residue for 6 hours was not more than 0.01%. Subsequently, the dried residue was fed to a 10-liter vessel and 4,500 ml-of tert-butyl methyl ether was added thereto, followed by stirring for 1 hour, thereby obtaining a polycarboxylic acid mixture as an extract with the tert-butyl methyl ether. A salt which had not been dissolved in the tert-butyl methyl ether was removed by filtration. To the extract (i.e., filtrate) was added 50 g of anhydrous magnesium sulfate, followed by stirring for 1 hour, thereby drying the extract. A precipitate was removed from the extract by filtration to thereby obtain a filtrate. The solvent (i.e., tert-butyl methyl ether) was distilled off from the obtained filtrate at 50° C. under reduced pressure by means of a rotary evaporator, thereby obtaining a residue. The obtained residue was dried at 40° C. under reduced pressure, thereby obtaining a polycarboxylic acid mixture in an amount of 197.8 g (the yield of the polycarboxylic acid mixture: 91%).

The nitrogen content of the obtained polycarboxylic acid mixture was measured, and it was found that the polycarboxylic acid mixture had a nitrogen content of 533 ppm by weight. The composition of the polycarboxylic acid mixture was determined by LC (liquid chromatography), and it was found that the polycarboxylic acid mixture was comprised of 93.2% by weight of 1,3,6-hexanetricarboxylic acid, 5.9% by weight of 3-carboxymethyl-1,5-dicarboxypentane and 0.9% by weight of adipic acid.

The color tone of the polycarboxylic acid mixture was measured by the above-mentioned method. As a result, it was found that the polycarboxylic acid mixture had a psychometric lightness L-value of 99.92, a psychometric chroma a-value of −0.02 and a psychometric b-value of −0.13. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 99.87, a psychometric chroma a-value of −0.04 and a psychometric chroma b-value of 0.10. The color difference ΔE of the polycarboxylic acid mixture was 0.24, wherein the ΔE is an index for the thermal stability of the polycarboxylic acid mixture. Further, another sample of the polycarboxylic acid mixture was heated at 160° C. for 3 hours, and the color tone of the sample of the polycarboxylic acid mixture was measured by the above-mentioned method. As a result, it was found that the polycarboxylic acid mixture after heating at 160° C. for 3 hours had a psychometric lightness L-value of 97.45, a psychometric chroma a-value of −1.19 and a psychometric chroma b-value of 6.57. The color difference ΔE as calculated using the L-value of 97.45, the a-value of −1.19 and the b-value of 6.57 was 7.00.

COMPARATIVE EXAMPLE 1

916 g of a hydrolysis reaction mixture (D) was obtained in substantially the same manner as in Example 1. The pH value of the obtained hydrolysis reaction mixture (D) was adjusted to 1 using a 36% by weight hydrochloric acid while cooling the hydrolysis reaction mixture (D) using ice so that the temperature of the hydrolysis reaction mixture (D) did not exceed 20° C., thereby obtaining 1,371 g of a hydrolysis reaction mixture (K) having a pH value of 1. Subsequently, water was removed from the hydrolysis reaction mixture (K) by means of a rotary evaporator at a temperature of from 88 to 92° C. under reduced pressure, thereby obtaining a residue. The obtained residue was dried at 40° C. under reduced pressure, thereby obtaining a dried residue. The drying of the residue was performed to such a degree that the change in weight of the residue by drying the residue for 6 hours was not more than 0.01%. Subsequently, the dried residue was fed to a 10-liter vessel and 4,500 ml of tert-butyl methyl ether was added thereto, followed by stirring for 1 hour, thereby obtaining a polycarboxylic acid mixture as an extract with the tert-butyl methyl ether. A salt which had not been dissolved in the tert-butyl methyl ether was removed by filtration. To the extract (i.e., filtrate) was added 50 g of anhydrous magnesium sulfate, followed by stirring for 1 hour, thereby drying the extract. A precipitate was removed from the extract by filtration to thereby obtain a filtrate. The solvent (i.e., tert-butyl methyl ether) was distilled off from the obtained filtrate at 50° C. under reduced pressure by means of a rotary evaporator, thereby obtaining a residue. The obtained residue was dried at 40° C. under reduced pressure, thereby obtaining a polycarboxylic acid mixture in an amount of 203.4 g (the yield of the polycarboxylic acid mixture: 93%).

The nitrogen content of the obtained polycarboxylic acid mixture was measured, and it was found that the polycarboxylic acid mixture had a nitrogen content of 4,370 ppm by weight. The composition of the polycarboxylic acid mixture was determined by LC (liquid chromatography), and it was found that the polycarboxylic acid mixture was comprised of 93.5% by weight of 1,3,6-hexanetricarboxylic acid, 5.6% by weight of 3-carboxymethyl-1,5-dicarboxypentane and 0.2% by weight of adipic acid.

The color tone of the polycarboxylic acid mixture was measured by the above-mentioned method. As a result, it was found that the polycarboxylic acid mixture had a psychometric lightness L-value of 95.23, a psychometric chroma a-value of 0.65 and a psychometric b-value of 11.71. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 94.79, a psychometric chroma a-value of 0.92 and a psychometric chroma b-value of 12.90. The color difference ΔE of the polycarboxylic acid mixture was 1.30, wherein the ΔE is an index for the thermal stability of the polycarboxylic acid mixture.

COMPARATIVE EXAMPLE 2

68.88 g of the nitrile mixture (C) obtained in Example 1 and 500 g of a 20% by weight aqueous sodium hydroxide solution (which contained 2.5 mol of sodium hydroxide) were fed to a 1-liter four-necked flask equipped with a reflux condenser. The resultant mixture in the four-necked flask was heated under reflux for 5 hours while stirring by means of a Teflon-coated rotator which was operated by a magnetic stirrer, thereby performing the hydrolysis of the nitrile mixture (C). The resultant hydrolysis reaction mixture was cooled. To the hydrolysis reaction mixture was dropwise added 257.0 g of concentrated sulfuric acid (which contained 2.67 mol of sulfuric acid) while cooling the hydrolysis reaction mixture using ice so that the temperature of the hydrolysis reaction mixture did not exceed 20° C., thereby obtaining an aqueous solution having a pH value of 1.

Water was removed from the aqueous solution. The resultant residual solid was completely dried to thereby obtain a brown solid. The obtained brown solid was extracted with ethyl acetate using a Soxhlet's extractor. From the resultant extract was removed ethyl acetate using a rotary evaporator under reduced pressure to thereby obtain 72.5 of a yellow-brown solid polycarboxylic acid mixture (the yield of the polycarboxylic acid mixture: 77.7%).

The nitrogen content of the obtained polycarboxylic acid mixture was measured, and it was found that the polycarboxylic acid mixture had a nitrogen content of 1,471 ppm by weight. The composition of the polycarboxylic acid mixture was determined by LC (liquid chromatography), and it was found that the polycarboxylic acid mixture was comprised of 93.4% by weight of 1,3,6-hexanetricarboxylic acid, 5.7% by weight of 3-carboxymethyl-1,5-dicarboxypentane and 0.9% by weight of adipic acid.

The color tone of the polycarboxylic acid mixture was measured by the above-mentioned method. As a result, it was found that the polycarboxylic acid mixture had a psychometric lightness L-value of 95.93, a psychometric chroma a-value of 1.84 and a psychometric chroma b-value of 4.48. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 94.66, a psychometric chroma a-value of 1.39 and a psychometric chroma b-value of 9.27. The color difference ΔE of the polycarboxylic acid mixture was 4.98, wherein the ΔE is an index for the thermal stability of the polycarboxylic acid mixture.

COMPARATIVE EXAMPLE 3

20.0 g of the nitrile mixture (C) obtained in substantially the same manner as in Example 1 and 130.0 g of a 20% by weight aqueous sodium hydroxide solution (which contained 0.707 mol of sodium hydroxide) were fed to a 1-liter four-necked flask equipped with a reflux condenser. The resultant mixture in the four-necked flask was heated under reflux for 5 hours while stirring by means of a Teflon-coated rotator which was operated by a magnetic stirrer, thereby performing the hydrolysis of the nitrile mixture (C). The resultant hydrolysis reaction mixture was cooled. To the hydrolysis reaction mixture was dropwise added 68.7 g of concentrated sulfuric acid (which contained 0.70 mol of sulfuric acid) while cooling the hydrolysis reaction mixture using ice so that the temperature of the hydrolysis reaction mixture did not exceed 20° C., thereby obtaining a reaction mixture having a pH value of 1.

The obtained hydrolysis reaction mixture was extracted with 50 ml of tert-butyl methyl ether three times. The resultant extract was dried using anhydrous magnesium sulfate. The solvent (i.e., tert-butyl methyl ether) in the resultant dried extract was distilled off to obtain a residue. The obtained residue was introduced into a mixed solvent comprising 35 ml of acetone and 50 ml of cyclohexane. The resultant mixture was cooled to generate a precipitate in the mixture. The mixture containing the precipitate was filtered to recover the precipitate.

The precipitate was subjected to vacuum drying to thereby obtain 19.6 g of a polycarboxylic acid mixture (the yield of the polycarboxylic acid mixture: 72.7%).

The nitrogen content of the obtained polycarboxylic acid mixture was measured, and it was found that the polycarboxylic acid mixture had a nitrogen content of 1,223 ppm by weight. The composition of the polycarboxylic acid mixture was determined by LC (liquid chromatography), and it was found that the polycarboxylic acid mixture was comprised of 97.6% by weight of 1,3,6-hexanetricarboxylic acid, 2.0% by weight of 3-carboxymethyl-1,5-dicarboxypentane and 0.4% by weight of adipic acid.

The color tone of the polycarboxylic acid mixture was measured by the above-mentioned method. As a result, it was found that the polycarboxylic acid mixture had a psychometric lightness L-value of 96.70, a psychometric chroma a-value of 1.76 and a psychometric chroma b-value of 4.07. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 95.40, a psychometric chroma a-value of 1.16 and a psychometric chroma b-value of 8.46. The color difference ΔE of the polycarboxylic acid mixture was 4.62, wherein the ΔE is an index for the thermal stability of the polycarboxylic acid mixture.

COMPARATIVE EXAMPLE 4

161 g of the nitrile mixture (C) obtained in Example 1 and 395.4 g of a 36% by weight hydrochloric acid (which contained 3.9 mol of hydrogen chloride) were fed to a 1-liter four-necked flask equipped with a reflux condenser. The resultant mixture in the four-necked flask was heated under reflux for 24 hours while stirring by means of a Teflon-coated rotator which was operated by a magnetic stirrer, thereby performing the hydrolysis of the nitrile mixture (C). The resultant hydrolysis reaction mixture was cooled to room temperature and allowed to stand for 12 hours to generate a precipitate. The precipitate was removed from the hydrolysis reaction mixture by filtration to thereby obtain a filtrate. The obtained filtrate was dried up using a rotary evaporator and further subjected to vacuum drying to thereby obtain 220.3 g of a brown solid. To the obtained brown solid was added 881.2 g of distilled water, followed by warming using warm water having a temperature of about 40° C., thereby obtaining an aqueous solution having a pH value of 1.3, wherein the amount of the brown solid dissolved in the distilled water was 20% by weight, based on the weight of the aqueous solution. To the aqueous solution was added 22 g of an activated carbon (trade name: SHIRASAGI; grade: A; manufactured and sold by TAKEDA CHEMICAL INDUSTRIES, LTD., Japan), followed by stirring at room temperature for 1 hour. Then, the activated carbon was removed from the resultant mixture by filtration, thereby obtaining 1,068 g of a polycarboxylic acid mixture solution (L).

1,068 g of the polycarboxylic acid mixture solution (L) were fed to a crystallization vessel equipped with a refrigeration medium circulating jacket. The internal temperature of the crystallization vessel was lowered to −3° C. while stirring the contents of the vessel by means of a Teflon-coated stirring rod, followed by stirring for 24 hours, to thereby precipitate a crystal. The precipitated crystal was removed by filtration using a PTFE filter (pore size: 1 μm), thereby obtaining a mother liquor. The obtained mother liquor was subjected to a centrifugation using a centrifugal separator (basket size: 130 φ) at 4,000 rpm for 20 minutes, thereby obtaining a crystal. The obtained crystal had a water content of 13%. The crystal was subjected to vacuum drying, thereby obtaining 89.5 g of a polycarboxylic acid mixture (the yield of the polycarboxylic acid mixture: 41%).

The nitrogen content of the obtained polycarboxylic acid mixture was measured, and it was found that the polycarboxylic acid mixture had a nitrogen content of 11,800 ppm by weight. The composition of the polycarboxylic acid mixture was determined by LC (liquid chromatography), and it was found that the polycarboxylic acid mixture was comprised of 99.3% by weight of 1,3,6-hexanetricarboxylic acid, 0.5% by weight of 3-carboxymethyl-1,5-dicarboxypentane and 0.2% by weight of adipic acid.

The color tone of the polycarboxylic acid mixture was measured by the above-mentioned method. As a result, it was found that the polycarboxylic acid mixture had a psychometric lightness L-value of 99.08, a psychometric chroma a-value of 0.83 and a psychometric chroma b-value of 1.14. In addition, for evaluating the thermal stability of the polycarboxylic acid mixture, a sample of the polycarboxylic acid mixture was heated at 80° C. for 18 hours, and the color tone of the sample of the polycarboxylic acid mixture was measured by the above-mentioned method. As a result, it was found that the polycarboxylic acid mixture after heating at 80° C. for 18 hours had a psychometric lightness L-value of 96.58, a psychometric chroma a-value of 1.87 and a psychometric chroma b-value of 7.34. The color difference ΔE of the polycarboxylic acid mixture was 6.77, wherein the ΔE is an index for the thermal stability of the polycarboxylic acid mixture. Further, for evaluating the thermal stability of the polycarboxylic acid mixture at 160° C., another sample of the polycarboxylic acid mixture was heated at 160° C. for 3 hours, and the color tone of the sample of the polycarboxylic acid mixture was measured by the above-mentioned method. As a result, it was found that the polycarboxylic acid mixture after heating at 160° C. for 3 hours had a psychometric lightness L-value of 87.93, a psychometric chroma a-value of 1.37 and a psychometric chroma b-value of 14.74. The color difference ΔE as calculated using the L-value of 87.93, the a-value of 1.37 and the b-value of 14.74 was 17.61.

INDUSTRIAL APPLICABILITY

The polycarboxylic acid mixture of the present invention has not only excellent color tone (i.e., not discolored and substantially colorless and transparent) but also excellent color tone stability under heating. Therefore, the polycarboxylic acid mixture of the present invention can be advantageously used for producing, for example, a paint, a detergent, a builder for a cleaning agent, an anti-limescale agent, a lubricating oil, and various polycarboxylic acid derivatives, such as esters. By the method of the present invention, the polycarboxylic acid mixture having the above-mentioned excellent properties can be produced in high yield.

The invention claimed is:

1. A polycarboxylic acid mixture comprising 80% by weight or more of 1,3,6-hexanetricarboxylic acid,
   said polycarboxylic acid mixture having a psychometric lightness L-value of 98 or more, a psychometric chroma a-value of from −2.0 to 2.0 and a psychometric chroma b-value of from −2.0 to 3.0,
   said polycarboxylic acid mixture having a nitrogen content of 5,000 ppm by weight or less.

2. The polycarboxylic acid mixture according to claim 1, which has a psychometric lightness L-value of 99 or more, a psychometric chroma a-value of from −1.0 to 1.0 and a psychometric chroma b-value of from −1.0 to 1.0.

3. The polycarboxylic acid mixture according to claim 1 or 2, which has a nitrogen content of 500 ppm by weight or less.

4. The polycarboxylic acid mixture according to claim 1 or 2, which is obtained from a hydrolysis reaction mixture obtained by hydrolyzing a nitrile mixture comprised mainly of 1,3,6-tricyanohexane,
   said nitrile mixture being obtained as a by-product in a process for producing adiponitrile from acrylonitrile by electrodimerization or obtained by reacting acrylonitrile with adiponitrile.

5. A method for producing the polycarboxylic acid mixture of claim 1, which comprises the steps of:
   (1) adjusting the pH value of an aqueous hydrolysis reaction mixture solution obtained by hydrolyzing, in an aqueous medium, a nitrile mixture comprised mainly of 1,3,6-tricyanohexane to a level in the range of from 3 to 13, thereby obtaining an aqueous solution containing a salt of a polycarboxylic acid mixture,
   said nitrile mixture being obtained as a by-product in a process for producing adiponitrile from acrylonitrile by electrodimerization or obtained by reacting acrylonitrile with adiponitrile,
   (2) treating the aqueous solution with a solid adsorbent to obtain a treated aqueous solution,
   (3) converting the salt of a polycarboxylic acid mixture in said treated aqueous solution obtained in step (2) to a polycarboxylic acid mixture using an ion exchange resin, an electrodialyzer or an acid, thereby obtaining an aqueous solution containing a polycarboxylic acid mixture, and
   (4) recovering the polycarboxylic acid mixture from the aqueous solution obtained in step (3),
   wherein when the acid is used in step (3) for converting the salt to the polycarboxylic acid mixture, the recovered polycarboxylic acid mixture is subjected to an extraction with an organic solvent for the polycarboxylic acid mixture to obtain the polycarboxylic acid mixture as an extract with the organic solvent, followed by separation of the polycarboxylic acid mixture in said extract from the organic solvent.

6. The method according to claim 5, wherein said aqueous medium used for the hydrolyzing of the nitrile mixture in step (1) is water.

7. The method according to claim 5, wherein, in step (1), the pH value of the aqueous solution is adjusted to a level in the range of from 5 to 9.

8. The method according to claim 5, wherein said solid adsorbent used in step (2) is at least one adsorbent selected from the group consisting of an activated carbon, a silica gel and an activated alumina.

9. The method according to claim 5, wherein the conversion of the salt to the polycarboxylic acid mixture in step (3) is performed using said electrodialyzer.

10. The method according to any one of claims 5 to 9, wherein the aqueous solution obtained in step (3) is subjected to crystallization before step (4).

11. A curable composition comprising:
(a) a compound having two or more epoxy groups in a molecule thereof, and
(b) a curing agent comprising the polycarboxylic acid mixture of claim 1.

12. A paint comprising the curable composition of claim 11.

13. A cured composition obtained by curing the curable composition of claim 11.

* * * * *